US012014628B2

(12) United States Patent
Inoue et al.

(10) Patent No.: US 12,014,628 B2
(45) Date of Patent: Jun. 18, 2024

(54) MOBILE OBJECT MONITORING SYSTEM AND MOBILE OBJECT MONITORING METHOD

(71) Applicant: HONDA MOTOR CO., LTD., Tokyo (JP)

(72) Inventors: Shigeru Inoue, Wako (JP); Hideki Matsunaga, Wako (JP); Masamitsu Tsuchiya, Wako (JP); Kenji Komori, Wako (JP); Takahiro Kurehashi, Wako (JP); Hiroki Tanaka, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 240 days.

(21) Appl. No.: 17/199,804

(22) Filed: Mar. 12, 2021

(65) Prior Publication Data

US 2021/0295681 A1 Sep. 23, 2021

(30) Foreign Application Priority Data

Mar. 17, 2020 (JP) ................................ 2020-047008

(51) Int. Cl.
*G08G 1/017* (2006.01)
*G08G 1/00* (2006.01)
(Continued)

(52) U.S. Cl.
CPC ........... *G08G 1/017* (2013.01); *G08G 1/0104* (2013.01); *G08G 1/0112* (2013.01);
(Continued)

(58) Field of Classification Search
CPC ...... G08G 1/01; G08G 1/0104; G08G 1/0108; G08G 1/0112; G08G 1/0116;
(Continued)

(56) References Cited

U.S. PATENT DOCUMENTS

2008/0167821 A1* 7/2008 Breed .................... G08G 1/161
701/301
2013/0208733 A1 8/2013 Sugiyama et al.
(Continued)

FOREIGN PATENT DOCUMENTS

CN 103238296 A 8/2013
CN 105730427 A 7/2016
(Continued)

OTHER PUBLICATIONS

Chinese Office Action received in corresponding Chinese application No. 202110285648.8 dated Oct. 9, 2022 with English translation (19 pages).
(Continued)

*Primary Examiner* — Adam D Tissot
*Assistant Examiner* — Aaron K McCullers
(74) *Attorney, Agent, or Firm* — Rankin, Hill & Clark LLP

(57) ABSTRACT

A mobile object monitoring system that includes one or more terminal units and a monitoring unit that monitors an unknown mobile object around the one or more terminal units. Each terminal unit includes: an information acquisition component that acquires unknown mobile object information; a detected information generation component that generates a detected information set concerning an unknown mobile object; and a terminal-side communication component that transmits the detected information set. The monitoring unit includes: a collecting-side communication component that receives the detected information set; and a determination component that determines presence or absence of an unknown mobile object based on a collection of one or more detected information sets that have been received. The determination component establishes reliability of the collection of one or more detected information sets
(Continued)

based on the number of detected information sets that indicate the detection of a specific unknown mobile object that is at the same location at the same time.

14 Claims, 6 Drawing Sheets

(51) Int. Cl.

| | |
|---|---|
| ***G08G 1/01*** | (2006.01) |
| ***G08G 1/015*** | (2006.01) |
| ***G08G 1/065*** | (2006.01) |
| ***G08G 1/16*** | (2006.01) |

(52) U.S. Cl.
CPC ......... *G08G 1/0116* (2013.01); *G08G 1/0125* (2013.01); *G08G 1/0141* (2013.01); *G08G 1/015* (2013.01); *G08G 1/065* (2013.01); *G08G 1/167* (2013.01); *G08G 1/20* (2013.01)

(58) Field of Classification Search
CPC .. G08G 1/0125; G08G 1/0129; G08G 1/0141; G08G 1/015; G08G 1/017; G08G 1/065; G08G 1/16; G08G 1/165; G08G 1/166; G08G 1/167; G08G 1/20
USPC ........... 701/117, 118, 119; 308/104; 382/104
See application file for complete search history.

(56) References Cited

U.S. PATENT DOCUMENTS

| | | | | |
|---|---|---|---|---|
| 2016/0185325 | A1 | 6/2016 | Ike et al. | |
| 2017/0046958 | A1 | 2/2017 | Naka et al. | |
| 2017/0069090 | A1 | 3/2017 | Okumura et al. | |
| 2018/0003965 | A1* | 1/2018 | O'Toole | G08G 1/163 |
| 2018/0039269 | A1 | 2/2018 | Lambermont et al. | |
| 2018/0121763 | A1* | 5/2018 | Surnilla | G06V 10/809 |
| 2018/0233049 | A1 | 8/2018 | Ishii et al. | |
| 2018/0357493 | A1 | 12/2018 | Takamatsu et al. | |
| 2019/0088148 | A1* | 3/2019 | Jacobus | G08G 1/096716 |
| 2019/0202476 | A1* | 7/2019 | Tao | B60W 30/095 |
| 2019/0251316 | A1 | 8/2019 | Okumura et al. | |
| 2019/0311614 | A1* | 10/2019 | Yang | G08G 1/096827 |
| 2019/0325751 | A1* | 10/2019 | Altintas | G05D 1/0077 |
| 2020/0011987 | A1* | 1/2020 | Takehara | G01S 13/91 |
| 2020/0180638 | A1 | 6/2020 | Kanoh et al. | |
| 2021/0096918 | A1 | 4/2021 | Ogawa | |
| 2021/0124956 | A1 | 4/2021 | Takamatsu et al. | |

FOREIGN PATENT DOCUMENTS

| | | | |
|---|---|---|---|
| CN | 106463059 | A | 2/2017 |
| CN | 108447302 | A | 8/2018 |
| CN | 109922439 | A | 6/2019 |
| CN | 110446278 | A | 11/2019 |
| JP | 2004-326419 | A | 11/2004 |
| JP | 2015-230665 | A | 12/2015 |
| JP | 2017-055177 | A | 3/2017 |
| JP | 2020-004144 | A | 1/2020 |
| WO | 2017029847 | A1 | 2/2017 |
| WO | 2018216194 | A1 | 11/2018 |
| WO | 2019187041 | A1 | 10/2019 |

OTHER PUBLICATIONS

Japanese Office Action received in corresponding Japanese application No. 2020-047008 dated Aug. 22, 2023 with English translation (6 pages).

* cited by examiner

MOBILE OBJECT MONITORING SYSTEM AND MOBILE OBJECT MONITORING METHOD

CROSS-REFERENCE STATEMENT

This application is based on and claims priority from Japanese Patent Application No. 2020-047008, filed Mar. 17, 2020, the disclosure of which is hereby incorporated by reference herein in its entirety.

BACKGROUND

Technical Field

The disclosure relates to a mobile object monitoring system and mobile object monitoring method.

Related Art

Popularity of vehicles with automated driving functions has been rising in recent years as a means of realizing safe and comfortable travel while reducing the burden of drivers.

For an automated vehicle to travel safely, the driving support apparatus that the automated vehicle is equipped with must have accurate information regarding the distribution of objects that surround the vehicle. The objects may, for example, include guardrails, traffic signals, signs, and traffic participants such as other vehicles, motorcycles, bicycles, and pedestrians.

To address this need, Patent Literature 1 (Japanese Unexamined Patent Application Publication No. 2020-4144) discloses an obstacle map generation device for generating an obstacle map using information on obstacles that are observed by an obstacle observation means. According to Patent Literature 1, the generated obstacle map indicates a movable area for a vehicle, an area occupied by an obstacle, and a blind spot.

The obstacle map generation device according to Patent Literature 1 includes an obstacle information acquisition component for acquiring information on obstacles that are observed by the obstacle observation means; a calculation component for calculating obstacle locations based on the information on obstacles acquired by the obstacle information acquisition component; a virtual point setting component for setting a location of a virtual point that is different from where the obstacle observation means is installed; and a virtual area determination component for determining a movable area and blind spot as observed from the virtual point based on the locations of the virtual point and obstacles.

The obstacle map concerning distribution information of obstacles according to the obstacle map generation device of Patent Literature 1 contributes to the travel safety of automated vehicles.

However, gaining accurate and omission free information regarding an unknown mobile object that is in a blind spot of a point of observation remains an issue that is unresolved by the obstacle map generation device of Patent Literature 1. Furthermore, there is also an issue concerning reliability of information regarding the unknown mobile object.

SUMMARY

A mobile object monitoring system in accordance with an embodiment includes: one or more terminal units and a monitoring unit configured to collect information concerning an unknown mobile object around the one or more terminal units and to monitor the unknown mobile object. Each of the one or more terminal units includes: an information acquisition component configured to acquire unknown mobile object information, the unknown mobile object information including location information of the unknown mobile object; a detected information generation component configured to generate a detected information set concerning an unknown mobile object, the detected information set including the acquired unknown mobile object information, time information on a time of the acquisition, and identification information concerning the unknown mobile object; and a terminal-side communication component configured to transmit the generated detected information set. The monitoring unit includes: a collecting-side communication component configured to receive the detected information set transmitted from the terminal-side communication component of each of the one or more terminal units to form a collection of one or more detected information sets; and a determination component configured to determine presence or absence of the unknown mobile object based on the collection of one or more detected information sets. Regarding the collection of one or more detected information sets, the determination component is configured to establish reliability based on the number of detected information sets in a first group of detected information sets that indicate a detection of a specific unknown mobile object that is at the same location at the same time, the first group forming a part or whole of the collection of one or more detected information sets.

DRAWINGS

DETAILED DESCRIPTION

Figure 1:
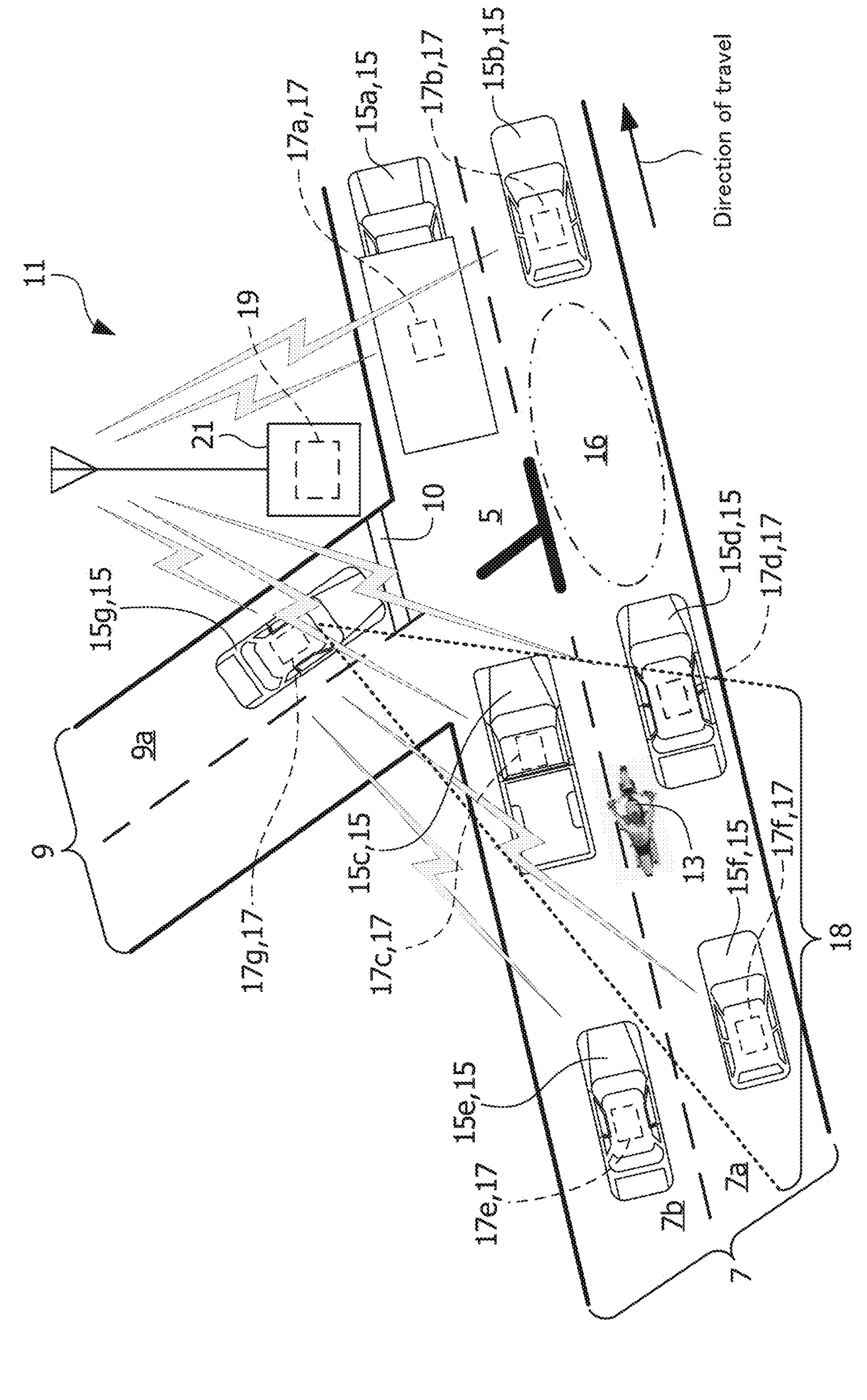
FIG. 1 is a schematic diagram showing an overview of a mobile object monitoring system in accordance with at least one embodiment.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

A detailed description of a mobile object monitoring system and mobile object monitoring method in accordance with an embodiment of the disclosure follows with reference to drawings.

Note that in the drawings, components with a common function that do not need to be identified separately use a common reference symbol in the drawings. Furthermore, for convenience of explanation, components may be shown schematically with shapes and sizes of the components modified or exaggerated.

The object of the disclosure is to provide a mobile object monitoring system and mobile object monitoring method that are capable of increasing the reliability of information regarding an unknown mobile object that is in a blind spot of a point of observation.

In the description that follows, a mobile object monitoring system and mobile object monitoring method that are in accordance with an embodiment of the disclosure and capable of increasing the reliability of information regarding an unknown mobile object in a blind spot of a point of observation are described.

<<Configuration of Mobile Object Monitoring System 11>>

A configuration of a mobile object monitoring system 11 according to an embodiment of the disclosure is described with reference to FIG. 1.

FIG. 1 is a schematic diagram showing an overview of a mobile object monitoring system 11 in accordance with an embodiment.

As shown in FIG. 1, a mobile object monitoring system 11 according to an embodiment includes a monitoring function that monitors an unknown mobile object 13 by collecting, through vehicle-to-vehicle communication or vehicle-to-roadside communication, information regarding an unknown mobile object 13 acquired at a plurality of detection sites and integrating the collection of information.

To achieve the monitoring function, the mobile object monitoring system 11 is configured to include, as shown in FIG. 1, a monitoring unit 19 and a plurality of terminal units 17*a*-17*g* that are installed respectively on a plurality of vehicles 15*a*-15*g*.

Note that when distinction among vehicles is not necessary, one or more of the vehicles 15*a*-15*g* may generically be referred to as a vehicle 15 or vehicles 15. Similarly, when distinction among terminal units is not necessary, one or more of the terminal units 17*a*-17*g* may generically be referred to as a terminal unit 17 or terminal units 17. Each of the plurality of vehicles 15*a*-15*g* corresponds to a "mobile object" of the disclosure. A "mobile object" of the disclosure may be any object that is capable of movement such as a large-sized vehicle, a standard-sized vehicle, a motorcycle, a bicycle, or a pedestrian.

The monitoring unit 19 may be installed, for example, on a roadside unit 21. The monitoring unit 19 includes a function for monitoring an unknown mobile object 13 around each of the plurality of vehicles 15*a*-15*g* by cooperating with the plurality of terminal units 17*a*-17*g*.

An unknown mobile object 13 is a mobile object with a part or whole thereof inside a blind spot 18 related to a point of observation (in the example of FIG. 1, the vehicle 15*g*) such as another vehicle, a motorcycle, a bicycle, or a pedestrian that is present around an own vehicle 15 that is installed with a terminal unit 17. An unknown mobile object 13 may be a mobile object that is showing an odd behavior, such as moving at a different speed to the own vehicle 15 and any other vehicle close by (that may, for example, be stationary).

A blind spot 18 of a point of observation is an area that cannot be viewed directly from the point of observation and is an area that is behind an object (including a sign) that is present around the point of observation.

Making an unknown mobile object 13 a monitoring target is based on the Applicants' knowledge that the presence of such an unknown mobile object 13 has a high tendency to disrupt traffic and to cause traffic accidents.

The environment in which the monitoring unit 19 and the terminal units 17 mounted on individual vehicles 15 are installed is next described.

FIG. 1 shows an unknown mobile object 13 and a plurality of vehicle 15*a*-15*g* that are travelling in the vicinity of a three-way junction 5. The three-way junction 5 of FIG. 1 has a minor road 9, with a single lane in each direction, intersecting with a main road 7 with two lanes in each direction.

On the main road 7, three vehicles 15*b*, 15*d*, and 15*f* are travelling at reduced speed on a right-hand lane 7*a*, and another three vehicles 15*a*, 15*c*, and 15*e* are travelling at reduced speed on a left-hand lane 7*b*. Note that the "right-hand" and "left-hand" describe sides with respect to a direction of travel as indicated by an arrow. The vehicles 15*a*-15*f* are equipped respectively with responding-side terminal units 17*a*-17*f*. Responding side terminal units 17*a*-17*f* refer to terminal units 17 that are providers of a detected information set.

In other words, on the main road 7 of FIG. 1, terminal units 17*b*, 17*d*, and 17*f*, which are installed respectively on vehicles 15*b*, 15*d*, and 15*f*, are shown to be located on the right-hand lane 7*a* and terminal units 17*a*, 17*c*, and 17*e*, which are installed respectively on vehicles 15*a*, 15*c*, and 15*e*, are shown to be located on the left-hand lane 7*b*.

On the minor road 9 (with a single lane in each direction), a single vehicle 15*g* is stationary at a stop line 10 on a driving lane 9*a*. The vehicle 15*g* is facing the three-way junction 5 and is waiting to join traffic in the main road 7 in the direction of travel. This vehicle 15*g* is equipped with a requesting-side terminal unit 17*g*. A requesting-side terminal unit 17*g* refers to a terminal unit 17 that requests the provision of a detected information set.

In other words, on the minor road 9 of FIG. 1, there is a single terminal unit 17*g* that is installed on the single vehicle 15*g* on the driving lane 9*a*. The driver of this vehicle 15*g* is waiting for an opportunity to move into a gap 16 between the vehicle 15*b* and vehicle 15*d* on the right-hand lane 7*a* to join the main road 7, a priority road.

An unknown mobile object 13 may, for example, be a motorcycle. The unknown mobile object 13 of FIG. 1 is moving through traffic at a higher speed compared to surrounding vehicles 15 on the main road 7. While traveling on the right-hand lane 7*a*, the unknown mobile object 13 makes use of the space to the left of the vehicles 15*f* and 15*d* that are traveling at reduced speed (note that "left" refers to a side with respect to the direction of travel).

In FIG. 1, the monitoring unit 19 is installed on the left corner of the three-way junction 5 as viewed when travelling towards the three-way junction 5 on the main road 7 in the direction of travel.

The three-way junction 5 may, for example, be an accident black spot (a junction with a high concentration of accidents).

When there is congestion at the three-way junction 5, because of a blind spot, movements of all obstacles including a vehicle 15 and an unknown mobile object 13 that are travelling on the main road 7 may not be observable. In the example of FIG. 1, a blind spot 18 spreads behind the vehicle 15*c* for the driver of the vehicle 15*g* that is waiting at the stop line 10 of the driving lane 9*a* of the minor road 9. The whole of the unknown mobile object 13 and the vehicle 15*f* and a back portion of the vehicle 15*d* are inside the blind spot 18.

The problem that is found in this example is that the unknown mobile object 13, the whole of which is inside the blind spot 18 of the driver of the vehicle 15*g*, is making its way to the three-way junction 5 by threading through a group of vehicles 15 at a greater speed compared to these vehicles 15.

In cases such as this example, if the driver of the vehicle 15*g* enters the three-way junction 5 by only paying attention to the movement of the vehicle 15*d* while attempting to join the main road 7 traffic on the right-hand lane 7*a*, the vehicle 15*g* is in danger of colliding with the approaching unknown mobile object 13 when entering the gap 16 between the vehicles 15*b* and 15*d*.

The mobile object monitoring system 11 according to an embodiment of the disclosure monitors an unknown mobile object 13 by (a) collecting, via vehicle-to-vehicle communication or vehicle-to-roadside communication, detected information sets concerning an unknown mobile object 13 (details are given later) that are each obtained at a corresponding detection site, and (b) integrating the collection of detected information sets concerning an unknown mobile object 13. By monitoring the unknown mobile object 13 in this way, the reliability of information regarding an unknown mobile object 13 that is present in the blind spot 18 of the vehicle 15*g* is improved significantly.

<<Configuration of an On-Board Device 31 Equipped with Terminal Unit 17>>

The configuration of an on-board device 31 equipped with the terminal unit 17 is described with reference to FIG. 2. The on-board device 31 is installed on a vehicle 15.

Figure 2:
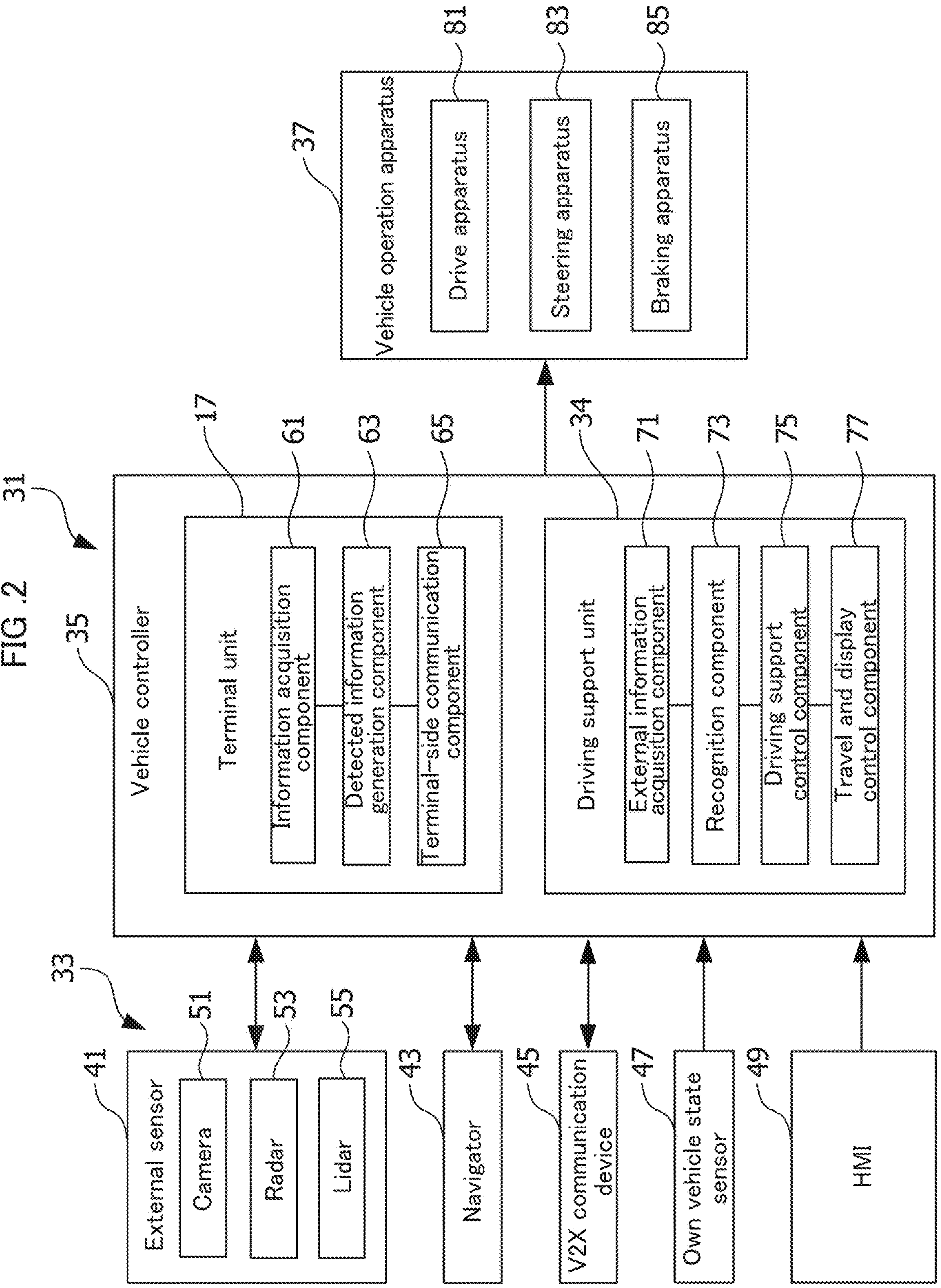
FIG. 2 is a functional block diagram showing a schematic configuration of an on-board device that is equipped with a terminal unit and installed on a vehicle.

FIG. 2 is a functional block diagram showing an overall configuration of an on-board device 31 that is equipped with the terminal unit 17.

As shown in FIG. 2, the on-board device 31 comprises an input-output apparatus 33 and a vehicle controller 35 that includes a terminal unit 17 and a driving support unit 34. The vehicle controller 35 is connected to a vehicle operation apparatus 37.

As shown in FIG. 2, the input-output apparatus 33 comprises an external sensor 41, a navigator 43, a V2X communication device 45, an own vehicle state sensor 47, and an HMI 49 (a human-machine interface 49).

<<External Sensor 41>>

The external sensor 41 includes a function to detect and obtain information on surrounding environment regarding one or more objects including a sign around the vehicle 15 on which the external sensor 41 is installed (an "own vehicle"). The external sensor 41 is configured to include a camera 51, radar 53, and lidar 55.

According to the embodiment, the external sensor 41 includes multiple cameras 51. One of the cameras 51 has an optical axis that is inclined in an obliquely downward direction in the front of the own vehicle 15 and includes a function for capturing an image of an area in the direction of travel of the own vehicle 15. A camera such as a CMOS (complementary metal-oxide semiconductor) camera or CCD (charge-coupled device) camera may be used as the camera 51 as deemed appropriate. The cameras 51 may, for example, be installed in the vicinity of a rearview mirror (not shown) in the own vehicle 15 interior and outside the own vehicle 15 on front portions of the doors on the right and left sides.

The cameras 51 are configured to periodically capture images of the surrounding views to the front in the forward direction of travel, the rear right side, the rear left side, and the rear of the own vehicle 15. The cameras 51 may also capture images of the surrounding views in response to a request from the vehicle controller 35 to acquire mobile object monitoring information.

According to the embodiment, the camera 51 installed in the vicinity of the rearview mirror may, for example, be configured from a pair of monocular cameras arranged next to one another. In some embodiments, the camera 51 may be a stereo camera.

Image information of views to the front in the forward direction of travel, the rear right side, the rear left side, and the rear of the own vehicle 15 that are captured by the cameras 51 are sent to the vehicle controller 35.

The radar 53 includes a function to acquire distribution information of an object, such as another vehicle travelling in front of the own vehicle 15, by irradiating the object with a radar wave and receiving a radar wave reflected from the object. The distribution information of an object includes a distance to the object and a direction thereof. A laser, a microwave, a millimeter-wave, or an ultrasonic wave may for example be used as the radar wave as deemed appropriate.

According to the embodiment, the own vehicle 15 may, for example, be equipped with a total of five radars 53, with three at the front and two at the rear of the own vehicle 15. The distribution information of an object obtained by each radar 53 is sent to the vehicle controller 35.

The lidar (the Light Detection and Ranging) 55 includes a function to detect a presence of an object and a distance thereto by measuring, for example, the time taken to detect scattered light in response to irradiation of light. According to the embodiment, the own vehicle 15 may, for example, be equipped with a total of five lidars 55, with two at the front and three at the rear of the own vehicle 15. The distribution information of an object obtained by each lidar 55 is sent to the vehicle controller 35.

<<The Navigator 43>>

The navigator 43 includes a function to map the current location of a vehicle 15 on which the navigator 43 is installed (an "own vehicle") and to provide route guidance to a destination. The navigator 43 may be configured to include a GNSS (Global Navigation Satellite System) receiver, navigation map information, a display unit with a touch panel that functions as a human-machine interface, a speaker, and a microphone (none are shown in the drawings). The navigator 43 derives the current location of the own vehicle 15 with the GNSS receiver and derives a route from the current location to a destination that is specified by a user.

The current location of the own vehicle 15 and the route to the destination derived by the navigator 43 are provided to the vehicle controller 35.

<<V2X Communication Device 45>>

The V2X communication device 45 that is installed in a vehicle 15 (an "own vehicle") includes a function to perform either a vehicle-to-vehicle communication (a V2V communication) with other vehicles 15 around the own vehicle 15 or a vehicle-to-roadside communication (a V2R communication) with a roadside unit 21 that is installed by the side of a main road 7 on which the own vehicle 15 travels. In some embodiments, TCP/IP may be used as the communication protocol of the V2X communication device 45.

The V2X communication device 45 broadcasts a detected information set (see FIG. 3) generated by the detected information generation component 63 (details will be given later) to vehicles 15 around the own vehicle 15 and to the roadside unit 21.

<<Own Vehicle State Sensor 47>>

The own vehicle state sensor 47 includes a function to acquire own vehicle state information concerning the state of a vehicle 15 in which the own vehicle state sensor 47 is installed (an "own vehicle"). The own vehicle state information acquired by the own vehicle state sensor 47 is sent to the vehicle controller 35.

The own vehicle state sensor 47 may include a number of sensors for detecting the behavior of the own vehicle 15 such as a speed sensor, an acceleration sensor, a steering angle sensor, a yaw rate sensor, a position sensor, and/or a direction sensor. The own vehicle state sensor 47 may include a sensor to detect an action of the driver (an action such as looking away from the direction of travel) or a sensor to obtain biological information of the driver (such as a heart rate or a level of awareness).

<<HMI 49>>

The HMI 49 includes driving operation components and non-driving operation components. The boundary between the two sets of components does not have to be clear. In some embodiments, a driving operation components may include a function of a non-driving operation (or vice versa).

The driving operation components of the HMI 49 may include, for example, an accelerator pedal, an accelerator pedal position sensor, an accelerator pedal reaction force control device, a brake pedal, a brake pedal position sensor, a gearshift, a gearshift position sensor, a steering wheel, a steering angle sensor, and a steering torque sensor.

The non-driving operation components of the HMI 49 may include, for example, a multi-function display arranged on a console, a speaker, various operation switches, a seat and seat operation device, a window and window operation device, and a cabin camera.

<<Configuration of Vehicle Controller 35>>

A description of the inner configuration of the vehicle controller 35 that is installed on a vehicle 15 (an "own vehicle") will be given with reference to FIGS. 2 and 3.

Figure 3:
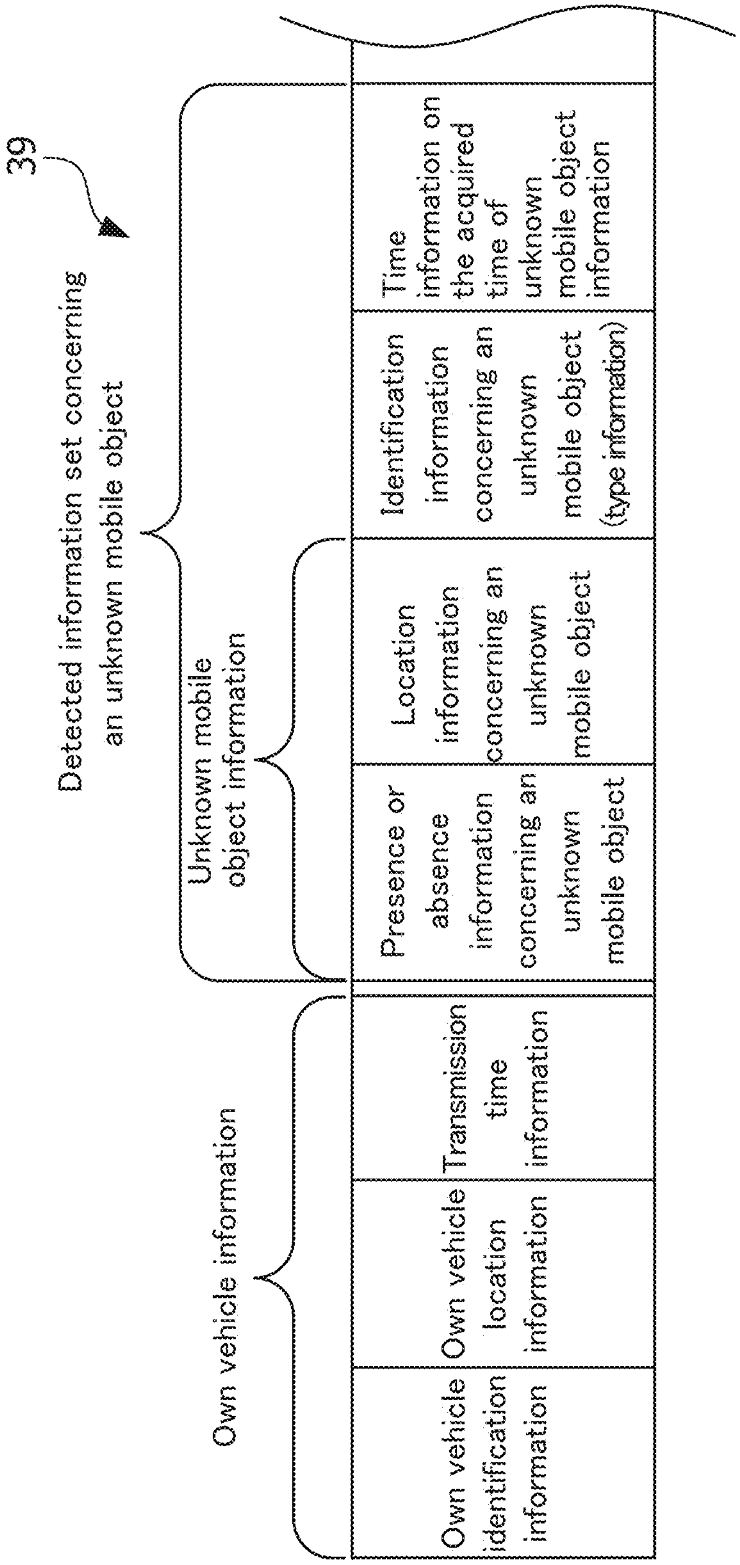
FIG. 3 is a schematic diagram of a data transmission frame that is transmitted from a terminal unit to a monitoring unit in a mobile object monitoring system in accordance with at least one embodiment.

FIG. 3 is a schematic diagram showing the configuration of a data transmission frame 39 that is transmitted from a terminal unit 17 to a monitoring unit 19 in a mobile object monitoring system 11 according to an embodiment of the disclosure.

The vehicle controller 35 may, for example, be realized with one or more processors or with a piece of hardware that includes an equivalent function. The vehicle controller 35 may, for example, be configured from one or more MPUs (micro-processing units) and/or one or more ECUs (an electronic control unit) that include a processor such as a CPU (a central processing unit), a memory, and a communication interface that are inter-connected by a bus.

The vehicle controller 35 includes: (a) a function to generate a detected information set regarding an unknown mobile object 13 around the own vehicle 15 using the external sensor 41 installed on the own vehicle 15; (b) a function to broadcast the generated detected information; and (c) a function to perform driving support of the own vehicle 15 including acceleration, deceleration, and steering thereof.

In order to realize the abovementioned functions, the vehicle controller 35 includes, as shown in FIG. 2, a terminal unit 17 and a driving support unit 34.

<<Configuration of Terminal Unit 17>>

The terminal unit 17 that is included in the vehicle controller 35 is described with reference to FIG. 2.

As shown in FIG. 2, the terminal unit 17 of the vehicle controller 35 is configured to include an information acquisition component 61, a detected information generation component 63, and a terminal-side communication component 65.

The information acquisition component 61 includes a function to acquire unknown mobile object information that comprises presence or absence information and location information concerning an unknown mobile object 13 around the own vehicle 15. The location information concerning an unknown mobile object 13 is only acquired when the unknown mobile object 13 is present. Note that in the proceeding description, the unknown mobile object information may sometimes be referred to as "information regarding an unknown mobile object 13". The unknown mobile object information is a compound word describing a more specific concept of information regarding an unknown mobile object 13.

The presence or absence information concerning an unknown mobile object 13 is information regarding whether an unknown mobile object 13 is present or not around the own vehicle 15. The location information concerning an unknown mobile object 13 is location information (such as a three-dimensional coordinate) of an unknown mobile object 13 at the time of acquisition of information regarding the unknown mobile object 13 by the external sensor 41.

When multiple unknown mobile objects 13 are present, the presence or absence information and location information concerning an unknown mobile object 13 are acquired for each of the unknown mobile objects 13 so that the presence or absence information is associated with the corresponding location information.

As shown in FIG. 3, the unknown mobile object information that includes presence or absence information and location information concerning an unknown mobile object 13 is used as a part of information included in the data transmission frame 39.

The detected information generation component 63 includes a function to generate a detected information set concerning an unknown mobile object 13. The detected information set concerning an unknown mobile object 13 includes unknown mobile object information acquired by the information acquisition component 61, time information on the acquired time thereof, and identification information concerning the unknown mobile object 13.

The time information on the acquired time of unknown mobile object information refers to information on the time of acquisition of location information of the unknown mobile object 13 using the external sensor 41. The identification information concerning an unknown mobile object 13 is information that is characteristic of the unknown mobile object 13 so that the unknown mobile object 13 may be identified. For example, a vehicle registration plate number of an unknown mobile object 13 corresponds to the identification information concerning an unknown mobile object 13. Note that the concept of the identification information concerning an unknown mobile object 13 includes a type of the unknown mobile object 13 (for example, a car, truck, motorcycle, bicycle, or pedestrian).

The time information on the acquired time is expressed in absolute time. An absolute time refers to a highly accurate and shareable information on time such as time represented as formal elapsed time in seconds (counted as actual elapsed time minus inserted leap seconds plus removed leap seconds) from a given time in UTC (Coordinated Universal Time).

As shown in FIG. 3, the detected information set that includes time information on the acquired time of location information concerning an unknown mobile object 13 and identification information concerning an unknown mobile object 13 is used as information of a data transmission frame 39. In addition to the detected information set, the data transmission frame 39 also includes own vehicle information and destination information (not shown in the drawings). The own vehicle information includes own vehicle identification information, own vehicle location information, and transmission time information.

The own vehicle identification information refers to information that is characteristic of the own vehicle 15 that enables the own vehicle 15 to be uniquely identified. For example, a license plate number of the own vehicle 15 corresponds to the own vehicle identification information.

The own vehicle location information is location information (for example, a three-dimensional coordinate) concerning the own vehicle 15 at the time of acquisition of information regarding an unknown mobile object 13 using the external sensor 41.

The transmission time information is time (a timestamp) when the terminal unit 17 transmits the data transmission frame 39 to the monitoring unit 19.

The destination information is information regarding the destination of the data transmission frame 39. In the embodiment, the destination information of the data transmission frame 39 is set to a broadcast address. The broadcast address is used so that a data communication frame 39 that includes relevant information may be sent out to multiple vehicles 15 at a location such as an intersection where multiple vehicles 15 of unknown addresses may be travelling.

The terminal-side communication component 65 includes a function to transmit a data transmission frame 39, which includes a detected information set concerning an unknown mobile object 13 generated by the detected information generation component 63, to a specific destination based on the destination information (a broadcast address).

The functions of the information acquisition component 61, detected information generation component 63, and terminal-side communication component 65 of the terminal unit 17 may be realized through the execution of a program (software) by a processor. In some embodiments, a part or whole of these functions may be realized with hardware such as an LSI (large-scale integration) or ASIC (application specific integrated circuit). In some embodiments, a part or whole of these functions may be realized using a combination of software and hardware.

<<Configuration of Driving Support Unit 34>>

As shown in FIG. 2, the driving support unit 34 included in the vehicle controller 35 is configured to include an external information acquisition component 71, a recognition component 73, a driving support control component 75, and a travel and display control component 77.

The external information acquisition component 71 includes a function to acquire surrounding environment information regarding an object, including a sign, around the own vehicle 15. The surrounding environment information acquired by the external information acquisition component 71 is sent to the recognition component 73.

The recognition component 73 may include functions such as an own vehicle location recognition function, a surrounding environment recognition function, an activity plan generation function, and/or a route generation function.

The own vehicle location recognition function is configured to recognize the driving lane of the own vehicle 15 and the location of the own vehicle 15 relative to the driving lane.

The surrounding environment recognition function is configured to recognize the surroundings of the own vehicle 15 including the location, speed, and acceleration of a surrounding vehicle 15.

The activity plan generation function is configured to set a starting location and destination location of automated vehicle operation.

The route generation function is configured to generate a route along which the own vehicle 15 is to travel, based on an activity plan generated by the activity plan generation function.

Information on the own vehicle location and surrounding environment that is recognized by the recognition component 73 is sent to the driving support control component 75. Information regarding the starting location and/or destination location of automated vehicle operation that is set by the recognition component 73 is sent to the driving support control component 75. Information on the route along which the own vehicle 15 is to travel that is generated by the recognition component 73 is sent to the driving support control component 75.

The driving support control component 75 includes a function to determine a policy on driving support control that includes driving force control, steering control, and braking force control. The determined policy may be based on information such as an operation of the driver, a starting location of automated vehicle operation that is set by the activity plan generation function, a destination location of automated vehicle operation that is set by the activity plan generation function, a route generated by the route generation function along which the own vehicle 15 is to travel, or any combination of the above. The policy on driving support control that is determined by the driving support control component 75 is sent to the travel and display control component 77.

The travel and display control component 77 performs travel control of the own vehicle 15 including driving force control, steering control, and braking force control in accordance with the policy on driving support control that is determined by the driving support control component 75. Furthermore, the travel and display control component 77 performs display control of a display device that the own vehicle 15 is equipped with.

The functions of the external information acquisition component 71, recognition component 73, driving support control component 75, and travel and display control component 77 of the driving support unit 34 may be realized through the execution of a program (software) by a processor. In some embodiments, a part or whole of these functions may be realized with hardware such as an LSI (large-scale integration) or ASIC (application specific integrated circuit). In some embodiments, a part or whole of these functions may be realized using a combination of software and hardware.

<<Configuration of Vehicle Operation Apparatus 37>>

As shown in FIG. 2, the vehicle operation apparatus 37 is configured to include a drive apparatus 81, steering apparatus 83, and braking apparatus 85.

The drive apparatus 81 outputs driving force (torque) to a driving wheel to enable the own vehicle 15 to move in accordance with a control instruction of the driving support unit 34 that the vehicle controller 35 is equipped with.

When the own vehicle 15 is a vehicle whose power source is an internal combustion engine, then the drive apparatus 81 may, for example, include an internal combustion engine, an engine ECU (an engine electronic control unit) for controlling the internal combustion engine, and a transmission (none shown in the drawings).

When the own vehicle 15 is an electric vehicle whose power source is an electric motor, the drive apparatus 81 may, for example, include a traction motor and a motor ECU (a motor electronic control unit) for controlling the traction motor (neither the traction motor nor the motor ECU are shown in the drawings).

When the own vehicle 15 is a hybrid vehicle, the drive apparatus 81 may, for example, include an internal combustion engine, a transmission, an engine ECU, a traction motor, and a motor ECU (none shown in the drawings).

The steering apparatus 83 may include, for example, a steering ECU (a steering electronic control unit) and an electric motor (neither are shown in the drawings). The electric motor, for example, changes the direction of steered wheels by applying force with a rack and pinion mechanism. The steering ECU drives the electric motor to change the direction of the steered wheel in accordance with information on a steering angle and steering torque based on steering operation of a driver or in accordance with a control instruction by the driving support unit 34 of the vehicle controller 35.

The braking apparatus 85 may, for example, be an electric servo brake system that includes a brake caliper, a cylinder for transmitting hydraulic pressure to the brake caliper, an electric motor for generating hydraulic pressure in a cylinder, and a brake control component (none shown in the drawings). The brake control component of the electric servo brake system controls the electric motor according to a control instruction from the driving support unit 34 of the vehicle controller 35 so that brake torque according to a brake operation is applied to individual wheels.

<<Configuration of Monitoring Unit 19>>

Figure 4:
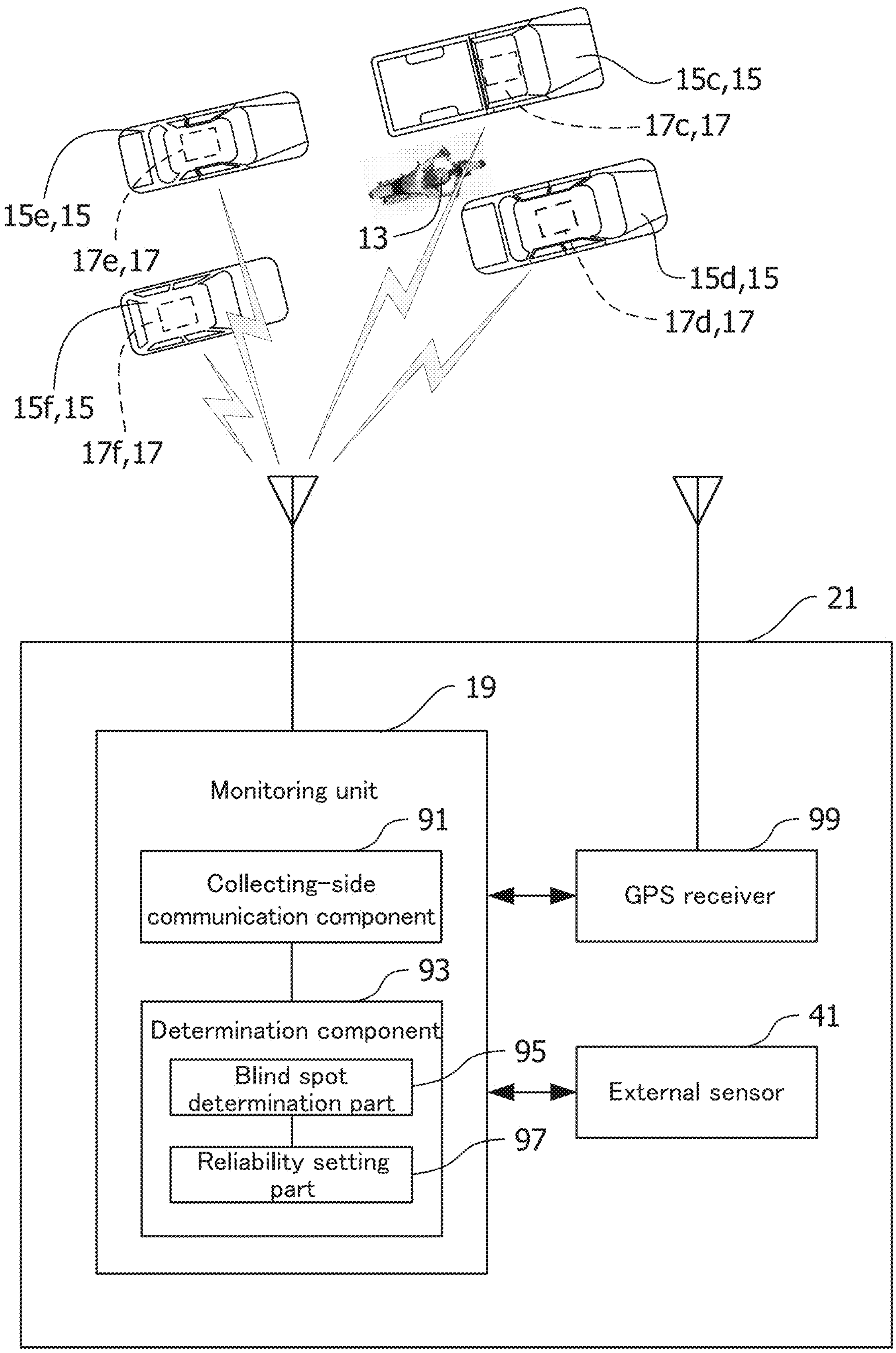
FIG. 4 is a functional block diagram showing a schematic configuration of a monitoring unit.

The monitoring unit 19 that a roadside unit 21 is installed with is described with reference to FIG. 4. FIG. 4 is a functional block diagram showing the configuration of the monitoring unit 19 in schematic form.

The monitoring unit 19 installed in a roadside unit 21 may, for example, be realized with one or more processors or with a piece of hardware that includes an equivalent function. The monitoring unit 19 may, for example, be configured from one or more MPUs (micro-processing units) and/or one or more ECUs (an electronic control unit) that include a processor such as a CPU (a central processing unit), memory, and communication interface that are interconnected by a bus.

In addition to the monitoring unit 19, the roadside unit 21 is equipped with a GPS receiver 99 and an external sensor 41. Before continuing with the description of the monitoring unit 19 therefore, descriptions of the GPS receiver 99 and external sensor 41 are given below.

The GPS receiver 99 includes a function to receive position signals from multiple GPS satellites and to determine the absolute position (latitude, longitude, and altitude) of the roadside unit 21 based on the position signals.

The external sensor 41 includes a function to detect and acquire information on the surrounding environment of the roadside unit 21 regarding objects including signs that are present around the roadside unit 21.

As shown in FIG. 4, the monitoring unit 19 is configured to include a collecting-side communication component 91 and determination component 93.

As shown in FIG. 4, the collecting-side communication component 91 includes a function to receive a detected information set concerning an unknown mobile object 13 that has been sent from a terminal-side communication component 65 of a terminal unit 17 installed in a vehicle 15. Detected information sets concerning an unknown mobile object 13 that are each sent from a corresponding one of a plurality of terminal units 17 and received by the collecting-side communication component 91 are sent to the determination component 93.

The determination component 93 includes a function that, in a basic form, determines the presence or absence of an unknown mobile object 13 based on the plurality of detected information sets concerning an unknown mobile object 13 that have been received by the collecting-side communication component 91.

As shown in FIG. 4, the determination component 93 is configured to include a blind spot determination part 95 and reliability setting part 97.

The blind spot determination part 95 includes a function to determine the presence or absence of an unknown mobile object 13 in a blind spot 18 related to a point of observation (in the example of FIG. 1, the vehicle 15*g* is the point of observation).

As described earlier, a blind spot 18 related to a point of observation is an area that cannot be viewed directly from the point of observation and is an area that spreads behind an object (such as a sign) that is present around the point of observation.

To determine the presence or absence of an unknown mobile object 13 in a blind spot 18 related to a point of observation, technologies regarding blind spot determination disclosed in Patent Literature 2 of the Applicant (publication number WO 2018/216194, filed May 26, 2017) and Patent Literature 3 of the Applicant (publication number US 2020/0180638, published Jun. 11, 2020) may, for example, be adopted as deemed appropriate. Teachings regarding blind spot determination disclosed in Patent Literature 2 and Patent Literature 3 are incorporated herein by reference (as part of the description regarding determination of the presence or absence of an unknown mobile object 13 in a blind spot 18 related to a point of observation).

The reliability setting part 97 includes a function to establish, regarding a plurality of detected information sets received by the collecting-side communication component 91, the reliability of the detected information sets based on the number of detected information sets concerning an unknown mobile object 13 describing the detection of a specific unknown mobile object 13 that is at the same location at the same time.

The reliability of detected information sets is an index that measures the reliability of information regarding an unknown mobile object 13 included in the detected information sets, including the presence or absence information and location information concerning an unknown mobile object 13.

Algorithms that may be used for setting the reliability of detected information sets will be described later.

The functions of the collecting-side communication component 91 and determination component 93 of the monitoring unit 19 may be realized through the execution of a program (software) by a processor. In some embodiments, a part or whole of these functions may be realized with hardware such as an LSI (large-scale integration) or ASIC (application specific integrated circuit). In some embodiments, a part or whole of these functions may be realized using a combination of software and hardware.

<<Operation of Mobile Object Monitoring System 11>>

The operation of a mobile object monitoring system 11 according to an embodiment of the disclosure is described with reference to FIG. 5.

Figure 5:
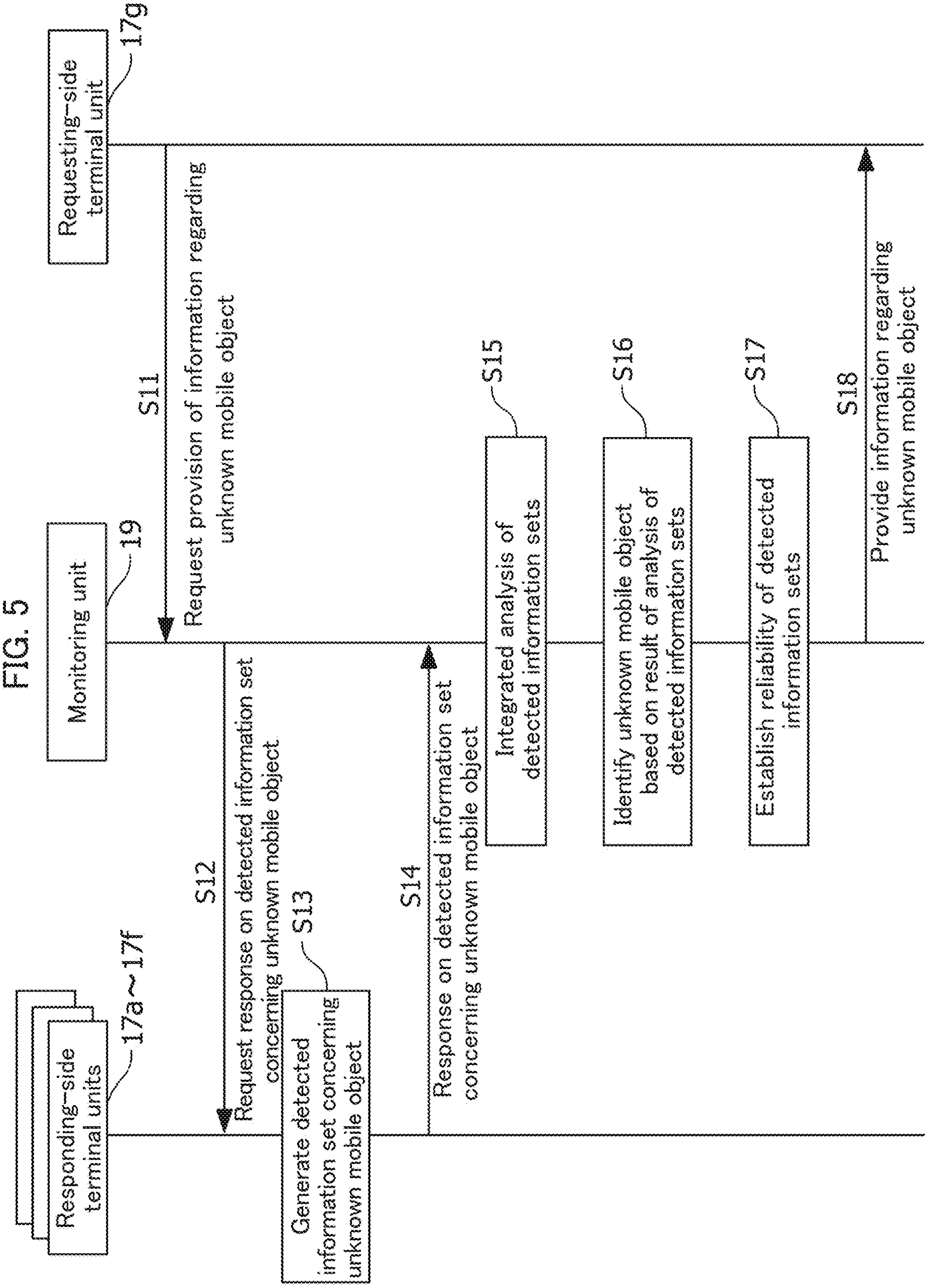
FIG. 5 is a diagram showing a series of steps involving information processing performed sequentially by a monitoring unit (a requesting side) and terminal units (on a responding side) of a mobile object monitoring system in accordance with at least one embodiment.

FIG. 5 is a diagram showing a series of steps involving the processing of information that are performed sequentially by a monitoring unit 19 (a requesting side) and individual terminal units 17 (on a responding side) of a mobile object monitoring system 11 in accordance with at least one embodiment.

In the mobile object monitoring system 11, the processing of information is performed individually by (a) a requesting-side on-board device that requests a detected information set regarding an unknown mobile object 13 (in the example of FIG. 1, the terminal unit 17*g* of the vehicle 15*g*), (*b*) a responding-side on-board device that responds by acquiring a detected information set concerning an unknown mobile object 13 (in the example of FIG. 1, each of the plurality of terminal units 17*a*-17*f* that are installed respectively in the plurality of vehicles 15*a*-15*f*), and (*c*) a monitoring unit 19 (installed on the roadside unit 21) that mediates the exchange of information between the on-board devices, under a traffic environment such as the three-way junction 5 shown in FIG. 1.

In step S11 of FIG. 5, the requesting-side terminal unit 17*g* (that is included in an on-board device 31) of vehicle 15*g* transmits a request-for-information-provision signal requesting a provision of information regarding an unknown mobile object 13 through broadcasting via a termina-side communication component 65 and V2X communication device 45.

The vehicle 15*g* installed with the requesting-side terminal unit 17*g* is waiting (temporarily stationary) at the stop line 10 of the minor road 9. The driver of the vehicle 15*g* is looking to join the traffic on the main road 7 by using the gap 16 between vehicles 15*b* and 15*d* on the right-hand lane 7*a*.

The transmission of the request-for-information-provision signal by the requesting-side terminal unit 17*g* of step S11 may be omitted.

In step S12, the monitoring unit 19, upon receiving the request-for-information-provision signal from the requesting-side terminal unit 17*g*, transmits a request-to-respond-with-information signal requesting a response on a detected information set concerning an unknown mobile object 13 through broadcasting via the collecting-side communication component 91. In this request-to-respond-with-information signal, information is included on a designated time when unknown mobile object information is to be acquired by the responding-side terminal units 17*a*-17*f*.

Consider a case where a single unknown mobile object 13 is present in a blind spot at a designated time for acquiring the unknown mobile object information. When this time for acquiring the unknown mobile object information is not designated, the resulting group of unknown mobile object information acquired at different times will indicate the presence of the unknown mobile object 13 at different locations that correspond to the different times of acquisition. As a consequence, identification of the unknown mobile object 13 through integration of detected information sets concerning an unknown mobile object 13 that include the concept of unknown mobile object information becomes more difficult.

The designated time is set to a time that includes a predetermined delay time with respect to the transmission time of request to respond with information signal. The predetermined delay time allows for a preparation period for the responding-side terminal units 17*a*-17*f* to acquire the unknown mobile object information at the designated time with certainty.

Even in cases where the transmission of the request-for-information-provision signal by the requesting-side terminal unit 17*g* of step S11 is omitted, the request-to-respond-with-information signal requesting a response on a detected information set concerning an unknown mobile object 13 may still be transmitted by the monitoring unit 19 via the collecting-side communication component 91. For example, the monitoring unit 19 may repeatedly broadcast a request-to-respond-with-information signal at a predetermined interval of time. For example, the monitoring unit 19 may broadcast a request-to-respond-with-information signal based on the state of traffic at the three-way junction 5 as perceived by the external sensor 41 of the roadside unit 21. For example, the monitoring unit 19 may broadcast a request-to-respond-with-information signal based on whether there is a vehicle 15 waiting at the stop line 10 of the minor road 9.

In step S13, each of the responding-side terminal units 17*a*-17*f* acquires unknown mobile object information that includes the presence or absence information and location information concerning an unknown mobile object 13 at the designated time included in the request-to-respond-with-information signal. The responding-side terminal units 17*a*-17*f* each generates a detected information set concerning an unknown mobile object 13 that includes the unknown mobile object information that has been acquired, time information on the time of acquisition of the unknown mobile object information, and identification information concerning the unknown mobile object 13.

In step S14, each of the responding-side terminal units 17*a*-17*f* broadcasts, via a terminal-side communication component 65 and V2X communication device, an information response signal (see the data transmission frame 39 of FIG. 3) that includes a response on a detected information set concerning an unknown mobile object 13.

In step S15, upon receiving the information response signals from the responding-side terminal units 17*a*-17*f*, the monitoring unit 19 integrates and analyzes the detected information sets concerning an unknown mobile object 13. In the integrated analysis of the detected information sets concerning an unknown mobile object 13, the number of responses in which the detected information set concerning an unknown mobile object 13 indicates the detection of a specific unknown mobile object 13 that is at the same location at the same time is counted. The number of responses in which the detected information set indicates the absence of an unknown mobile object 13 is also counted.

In step S16, the monitoring unit 19 identifies the presence or absence concerning an unknown mobile object 13 and the location thereof based on the result of the analysis of detected information sets carried out in step S15.

In step S17, the monitoring unit 19 establishes the reliability of detected information sets concerning an unknown mobile object 13 based on the following result of the analysis of detected information sets of step S15: the number of responses in which the detected information set concerning an unknown mobile object 13 indicates the detection of a specific unknown mobile object 13 that is at the same location at the same time.

For example, when the number of responses in which the detected information set concerning an unknown mobile object 13 indicates the detection of a specific unknown mobile object 13 that is at the same location at the same time is above a predetermined response number threshold, the reliability of the detected information sets concerning an unknown mobile object 13 may be established as being high, and the presence of the specific unknown mobile object 13 at the detected location may be established.

In some embodiments, the monitoring unit 19 may be configured to establish the reliability of detected information sets concerning an unknown mobile object 13 based further on the identification information concerning an unknown mobile object 13 (the identification information may include type information identifying a type of unknown mobile object 13 such as a large-sized vehicle, standard-sized vehicle, motorcycle, bicycle, or pedestrian).

For example, consider two cases with the same number of responses in which the detected information set concerning an unknown mobile object 13 indicates the detection of a specific unknown mobile object 13 that is at the same location at the same time. In the two cases, however, the type of unknown mobile object 13, which is based on the identification information concerning an unknown mobile object 13, are different. In the first case, the type of unknown mobile object 13 is identified as a vulnerable road user such as a motorcycle, bicycle, or pedestrian. In the second case, the type of unknown mobile object 13 is identified as a less vulnerable road user such as a large-sized vehicle or a standard-sized vehicle. The monitoring unit 19 may be configured so that the reliability of detected information sets indicating the presence of the specific unknown mobile object 13 at detection sites is established to be higher for the first case than for the second case. This may be achieved, for example, by lowering the response number threshold for cases involving an unknown mobile object 13 that is identified as a vulnerable road user so that an event involving the presence of an unknown mobile object 13 that is a vulnerable road user is affirmed more strongly.

Establishing higher reliability of detected information sets indicating the presence of a specific unknown mobile object 13 at detection sites includes cases where the dependability of detected information sets is determined for the first time, as well as cases where the dependability of detected information sets is established further.

By making the presence of vulnerable road users stand out as unknown mobile objects 13 compared to less vulnerable road users, the protection of vulnerable road users may be prioritized.

The terms "vulnerable road user" and "less vulnerable road user" are relative concepts. For example, when a large-sized vehicle and standard-sized vehicle are compared with one another, the former is the less vulnerable road user and the latter the vulnerable road user. When a motorcycle, bicycle, and pedestrian are compared with one another, the level of vulnerability as a road user rises in the given order (i.e., a pedestrian is more vulnerable than a bicycle, which in turn is more vulnerable than a motorcycle).

In some embodiments, the monitoring unit 19 may establish the reliability of detected information sets concerning an unknown mobile object 13 based on the following result of the analysis of detected information sets of step S15: the number of responses in which the detected information set concerning an unknown mobile object 13 indicates the detection of a specific unknown mobile object 13 that is at the same location at the same time and the number of responses in which the detected information set indicates the absence of an unknown mobile object 13.

In these embodiments, the reliability of detected information sets concerning an unknown mobile object 13 is set to be higher the greater the number of responses in which the detected information set concerning an unknown mobile object 13 indicates the detection of a specific unknown mobile object 13 that is at the same location at the same time and greater the sum of a first number of responses and second number of responses, the first number of responses being the number of responses in which the detected information set indicates the detection of the specific unknown mobile object 13 and the second number of responses being the number of responses in which the detected information set indicates the absence of the specific unknown mobile object 13. In doing so, the level of certainty of the specific unknown mobile object 13 being present at detection sites is raised.

In step S18, the monitoring unit 19 broadcasts, via the collecting-side communication component 91, an information provision signal providing information regarding an unknown mobile object 13 including the reliability of detected information sets concerning an unknown mobile object 13.

The requesting-side terminal unit 17*g* that receives the information provision signal from the roadside unit 21 performs driving support of the own vehicle 15*g* based on the information regarding an unknown mobile object 13. For example, the information regarding an unknown mobile object 13 may be displayed on a multi-function display.

<<Advantageous Effects of Mobile Object Monitoring System 11 and Mobile Object Monitoring Method According to Embodiments>>

A description of the advantageous effects of the mobile object monitoring system 11 and mobile object monitoring method in accordance with the embodiments of the disclosure follows.

In a first aspect of the disclosure, the mobile object monitoring system 11 includes one or more terminal units 17 and a monitoring unit 19 that is configured to monitor an unknown mobile object 13 through collecting information concerning an unknown mobile object 13 around the one or more terminal units 17.

Each of the one or more terminal units 17 includes an information acquisition component 61, a detected information generation component 63, and a terminal-side communication component 65. The information acquisition component 61 acquires unknown mobile object information that includes location information of an unknown mobile object 13. The detected information generation component 63 generates a detected information set concerning an unknown mobile object 13 that includes the acquired unknown mobile object information, time information on the time of acquisition of the unknown mobile object information, and identification information concerning the unknown mobile object 13. The terminal-side communication component 65 transmits the generated detected information set.

The monitoring unit 19 includes a collecting-side communication component 91 and a determination component 93. The collecting-side communication component 91 receives one or more detected information sets transmitted from one or more terminal-side communication components 65 of the one or more terminal units 17. The determination component 93 determines the presence or absence of an unknown mobile object 13 based on the received one or more detected information sets. The determination component 93 is configured to establish reliability of the received one or more detected information sets based on the number of detected information sets that indicate the detection of a specific unknown mobile object 13 that is at the same location at the same time.

In the mobile object monitoring system 11 according to the first aspect, the information acquisition component 61 of the terminal unit 17 acquires unknown mobile object information that includes location information of an unknown mobile object 13. The detected information generation component 63 generates a detected information set concerning an unknown mobile object 13 that includes the acquired unknown mobile object information, time information on the time of acquisition of the acquired unknown mobile object information, and identification information concerning the unknown mobile object 13. The terminal-side communication component 65 transmits the generated detected information set.

The collecting-side communication component 91 of the monitoring unit 19 receives one or more detected information sets transmitted from one or more terminal-side communication components 91. The determination component 93 determines the presence or absence of an unknown mobile object 13 based on the received one or more detected information sets.

The determination component 93, regarding the received one or more detected information sets, establishes the reliability of the one or more detected information sets based on the number of detected information sets that indicate the detection of a specific unknown mobile object 13 that is at the same location at the same time.

The monitoring unit 19 has been described as being "configured to monitor an unknown mobile object 13 through collecting information concerning an unknown mobile object 13" to clarify that the monitoring unit 19 does not need to monitor an unknown mobile object 13 directly as part of its function. In some embodiments, however, the monitoring unit 19 may include a function to directly monitor an unknown mobile object 13.

The phrase "establishes the reliability of the one or more detected information sets based on . . . " is used to treat the reliability of one or more detected information sets as taking a value that is based on a number relating to the one or more detected information sets.

In some embodiments, the terminal unit 17 may be installed in a mobile object that includes a communication function (such as a vehicle 15). In some embodiments, the terminal unit 17 may be installed in a roadside unit 21 that includes a communication function.

In some embodiments, the monitoring unit 19 may, similar to the terminal unit 17, be installed in a mobile object that includes a communication function (such as a vehicle 15). In some embodiments, the monitoring unit 19 may be installed in a roadside unit 21 that includes a communication function.

The mobile object monitoring system 11 according to the first aspect is configured to monitor an unknown mobile object 13 by collecting, via communication, sets of information regarding an unknown mobile object 13 that are each obtained at a corresponding one of a plurality of detection sites and integrating the sets of information regarding an unknown mobile object 13 to significantly increase the reliability of information regarding an unknown mobile object 13 in a blind spot 18 related to a point of observation.

In a second aspect of the disclosure, the mobile object monitoring system 11 includes a plurality of terminal units 17 and one monitoring unit 19. Each of the plurality of terminal units 17 are installed on a corresponding one of a plurality of mobile objects (vehicles 15). The monitoring unit 19 is configured to monitor an unknown mobile object 13 through collecting information concerning an unknown mobile object 13 around each of the plurality of mobile objects (vehicles 15).

The plurality of terminal units 17 each includes an information acquisition component 61, a detected information generation component 63, and a terminal-side communication component 65. The information acquisition component 61 is configured to acquire unknown mobile object information that includes presence or absence information of an unknown mobile object 13 and, when the unknown mobile object 13 is present, location information of the unknown mobile object 13. The detected information generation component 63 generates a detected information set concerning an unknown mobile object 13 that includes the acquired unknown mobile object information, time information on the time of acquisition thereof, and identification information concerning the unknown mobile object 13. The terminal-side communication component 65 is configured to transmit the generated detected information set.

The monitoring unit 19 includes a collecting-side communication component 91 and a determination component 93. The collecting-side communication component 91 is configured to receive a plurality of detected information sets that have each been sent from a corresponding one of the plurality of terminal-side communication components 65. The determination component 93 is configured to determine the presence or absence of an unknown mobile object 13 based on the plurality of detected information sets that have been received. The determination component 93 is configured to establish, regarding the plurality of detected information sets received, reliability of the detected information sets based on the number of detected information sets indicating the detection of a specific unknown mobile object 13 that is at the same location at the same time.

The first difference between the mobile object monitoring system 11 according to the first aspect and the mobile object monitoring system 11 according to the second aspect is that with the latter system, the information acquisition component acquires information on the presence or absence of an unknown mobile object 13 and, when the unknown mobile object 13 is present, acquires unknown mobile object information that includes location information of the unknown mobile object 13. The second difference is that with the latter system, there is one monitoring unit 19 associated with multiple terminal units 17 that are each installed in a corresponding one of a plurality of mobile objects (vehicles 15).

In the mobile object monitoring system 11 according to the second aspect, the information acquisition component 61 of each of the plurality of terminal units 17 (which are each installed on a corresponding one of the plurality of mobile objects [vehicles 15]) acquires unknown mobile object information that includes presence or absence information of an unknown mobile object and, when the unknown mobile object is present, location information of the unknown mobile object. The detected information generation component 63 generates a detected information set concerning an unknown mobile object 13 that includes the unknown mobile object information that has been acquired, time information on the time of acquisition of the unknown mobile object information, and identification information concerning the unknown mobile object 13. The terminal-side communication component 65 transmits the generated detected information set.

The monitoring unit 19 receives a plurality of detected information sets that have each been transmitted from a corresponding one of the plurality of terminal-side communication components 65. The determination component 93 determines the presence or absence of an unknown mobile object 13 based on the received plurality of detected information sets.

The determination component 93 establishes, regarding the plurality of detected information sets that have been received, the reliability of the detected information sets based on the number of detected information sets that indicate the detection of a specific unknown mobile object 13 that is at the same location at the same time.

In some embodiments, the terminal unit 17 may be installed in a mobile object (a vehicle 15) that includes a communication function. In some embodiments, the terminal unit 17 may be installed in a roadside unit 21 that includes a communication function. Note that these are similar to the examples of the mobile object monitoring system 11 according to the first aspect.

In some embodiments, the monitoring unit 19 may be installed in a vehicle 15 that includes a communication function. In some embodiments, the monitoring unit 19 may be installed in a roadside unit 21 that includes a communication function. Note that these are similar to the examples of the mobile object monitoring system 11 according to the first aspect.

In the mobile object monitoring system 11 according to the second aspect, the monitoring of an unknown mobile object 13 is performed by collecting, via communication, sets of information regarding an unknown mobile object 13 that have each been obtained at a corresponding one of a plurality of detection sites and integrating the sets of information to significantly increase the reliability of information regarding an unknown mobile object 13 in a blind spot 18 that is related to a point of observation.

The mobile object monitoring system 11 according to the second aspect adopts a configuration of a more generic concept in which the monitoring unit 19 may be installed in a vehicle 15 that includes a communication function or in a roadside unit 21 that includes a communication function.

Figure 6:
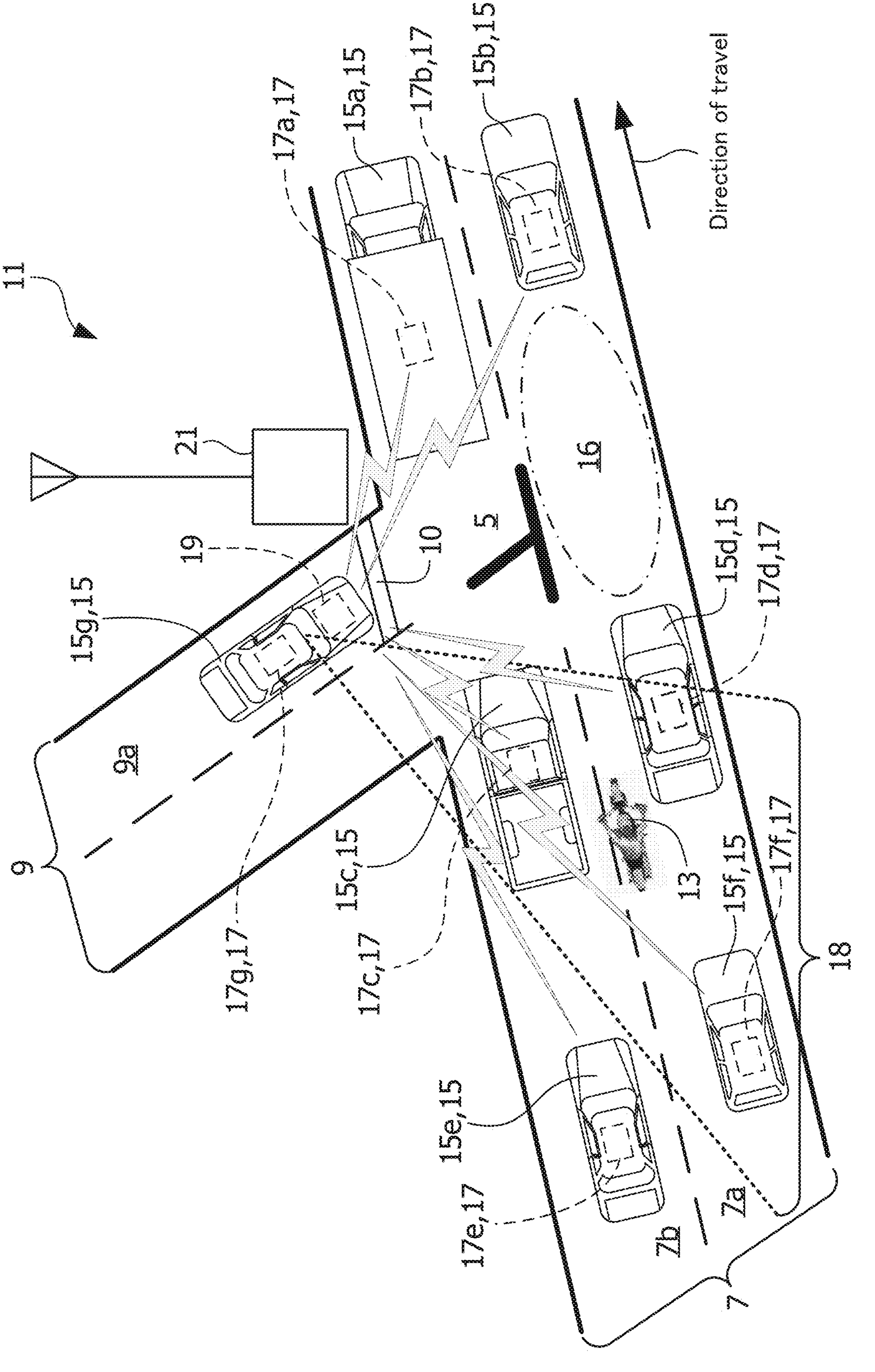
FIG. 6 is a schematic diagram showing an overview of a mobile object monitoring system in accordance with a variation of an embodiment.

In a third aspect of the disclosure, the mobile object monitoring system 11 is in accordance with the second aspect, and, as shown in FIG. 6, is further configured so that (a) a terminal unit 17 is installed in each one of a plurality of mobile objects such as vehicles 15 and (b) a mobile unit 19 is installed on mobile object such as a vehicle 15. Furthermore, the collecting-side communication component 91 of the monitoring unit 19 that is installed in a mobile object is configured to communicate with multiple terminal units 17 that are each installed in a corresponding one of the plurality of mobile objects in order to receive multiple detected information sets that have each been sent from a corresponding one of a plurality of terminal-side communication components 65.

The configuration of a monitoring unit 19 shown in FIG. 4 may be used for the monitoring unit 19 installed in a mobile object (a vehicle 15). In cases where the configuration of the monitoring unit 19 shown in FIG. 4 is adopted, for the external sensor 41, the one installed in the mobile object (a vehicle 15) may be used, and for GPS receiver 99, the one included in the navigator 43 of the mobile object (a vehicle 15) may be used.

The mobile object monitoring system 11 according to the third aspect differs from the mobile object monitoring system 11 according to the second aspect in that the monitoring unit 19 is installed on a mobile object (a vehicle 15) in the former (the third aspect).

Therefore, in the mobile object monitoring system 11 according to the third aspect, the collecting-side communication component 91 of the monitoring unit 19 that is installed in a mobile object (vehicle 15) receives multiple detected information sets that are each sent from a corresponding one of a plurality of terminal-side communication components 65 by communicating with multiple terminal units 17 that are each installed in a corresponding one of a plurality of mobile objects (vehicles 15).

In the mobile object monitoring system 11 according to the third aspect, the monitoring of an unknown mobile object 13 is performed by collecting, through communication with a plurality of mobile objects (vehicles 15), sets of information regarding an unknown mobile object 13 that have been acquired at a plurality of detection sites and integrating the sets of information to significantly improve the reliability of information regarding an unknown mobile object 13 in a blind spot 18 related to a point of observation.

In a fourth aspect of the disclosure, the mobile object monitoring system 11 is in accordance with the first, second, or third aspect. Furthermore, in the mobile object monitoring system 11 according to the fourth aspect, the identification information included in the detected information set concerning an unknown mobile object 13 includes type information indicating the type of the unknown mobile object 13.

The determination component 93 of the monitoring unit 19 may, regarding the plurality of detected information sets that have been received, be configured to establish reliability of the detected information sets based on type information of an unknown mobile object 13 that is included in the identification information of detected information sets that indicate the detection of a specific unknown mobile object 13 that is at the same location at the same time.

In the mobile object monitoring system 11 according to the fourth aspect, the determination component 93 of the monitoring unit 19 establishes, regarding the plurality of detected information sets that have been received, the reliability of the detected information sets based on type information of an unknown mobile object 13 that is included in the identification information of the detected information sets that indicate the detection of a specific unknown mobile object 13 that is at the same location at the same time.

The type information of an unknown mobile object 13 is information indicating what type of mobile object the unknown mobile object 13 is, such as a large-sized vehicle, standard-sized vehicle, motorcycle, or pedestrian.

For example, consider two cases with the same number of responses in which the detected information set concerning an unknown mobile object 13 indicates the detection of a specific unknown mobile object 13 that is at the same location at the same time. In the two cases, however, the type of unknown mobile object 13, which is based on the identification information concerning an unknown mobile object 13, are different. In the first case, the type of unknown mobile object 13 is identified as a vulnerable road user such as a motorcycle, bicycle, or pedestrian. In the second case, the type of an unknown mobile object 13 is identified as a less vulnerable road user such as a large-sized vehicle or standard-sized vehicle. The reliability of detected information sets indicating the presence of a specific unknown mobile object 13 at detection sites is established to be higher for the first case than for the second case.

Establishing a higher reliability of one or more detected information sets may, for example, be achieved by lowering a predetermined response number threshold, a criterion used for determining whether the reliability of one or more detected information sets concerning an unknown mobile object 13 is high (based on the number of responses in which the detected information set concerning an unknown mobile object 13 indicates the detection of a specific unknown mobile object 13 that is at the same location at the same time). The predetermined response number threshold is lowered for the purpose of affirming the presence of an unknown mobile object 13 that is a vulnerable road user at a detection site more strongly.

Compared to a mobile object monitoring system 11 according to the second or third aspect, the mobile object monitoring system 11 according to the fourth aspect makes the presence of a vulnerable road user as an unknown mobile object 13 more noticeable over the presence of a less vulnerable road user, and an advantageous effect of protecting vulnerable road users with priority can be expected.

In a fifth aspect of the disclosure, the mobile object monitoring system 11 is in accordance with the first, second, third, or fourth aspect. Furthermore, the collecting-side communication component 91 of the monitoring unit 19 is configured to transmit a request to acquire unknown mobile object information at a specified time, and the information acquisition component 61 of each of a plurality of terminal units 17 is configured to acquire unknown mobile object information at the specified time.

In the mobile object monitoring system 11 according to the fifth aspect, the collecting-side communication component 91 of the monitoring unit 19 transmits a request to acquire unknown mobile object information at a specified time and the information acquisition component 61 of each of the plurality of terminal units 17 acquires unknown mobile object information at the specified time.

Because the collecting-side communication component 91 of the monitoring unit 19 transmits a request to acquire unknown mobile object information at a specified time and the information acquisition component 61 of each of the plurality of terminal units 17 acquires unknown mobile object information at the specified time, an advantageous effect can be expected in the mobile object monitoring system 11 according to the fifth aspect. Compared to a mobile object monitoring system 11 according to the second, third, or fourth aspect, the process of identifying an unknown mobile object 13 (identifying an unknown mobile object 13 that is detected at the same location at the same time as a specific unknown mobile object 13) by integrating detected information sets concerning an unknown mobile object 13 (note that the detected information set includes the concept of unknown mobile object information) may be simplified and performed accurately.

In a sixth aspect of the disclosure, the mobile object monitoring system 11 is in accordance with the fifth aspect and the determination component 93 of the monitoring unit 19 is further configured to establish, regarding a plurality of detected information sets that have been received, the reliability of the detected information sets based on a sum of (a) the number of detected information sets indicating the detection of a specific unknown mobile object 13 that is at the same location at the same time and (b) the number of one or more detected information sets indicating the absence of the specific unknown mobile object 13.

In the mobile object monitoring system 11 according to the sixth aspect, the determination component 93 of the monitoring unit 19 establishes, regarding a plurality of detected information sets that have been received, the reliability of the detected information sets based on a sum of (a) the number of detected information sets indicating the detection of a specific unknown mobile object 13 that is at the same location at the same time and (b) the number of one or more detected information sets indicating the absence of the specific unknown mobile object 13.

The sum of (a) the number of detected information sets indicating the detection of a specific unknown mobile object 13 and (b) the number of one or more detected information sets indicating the absence of the specific unknown mobile object 13 is information (a parameter) on the number of mobile objects (vehicles 15) installed with a terminal unit 17 that is capable of providing information regarding an unknown mobile object 13 to the monitoring unit 19.

The reliability of detected information sets is a subject matter that may be processed statistically. Thus, in the mobile object monitoring system 11 according to the sixth aspect, the information (a parameter) on the number of mobile objects (vehicles 15) installed with a terminal unit 17 that is capable of providing information regarding an unknown mobile object 13 to the monitoring unit 19 may be taken into account when establishing the reliability of detected information sets.

Because information (a parameter) on the number of mobile objects (vehicles 15) installed with a terminal unit 17 that is capable of providing information regarding an unknown mobile object 13 to the monitoring unit 19 may be taken into account when establishing the reliability of detected information sets, an advantageous effect can be expected in the mobile object monitoring system 11 according to the sixth aspect. Compared to the mobile object monitoring system 11 according to the fifth aspect, it can be expected that the reliability of detected information sets to be established with greater accuracy.

In a seventh aspect of the disclosure, the mobile object monitoring system 11 is in accordance with the fifth aspect. Furthermore, the information acquisition component 61 included in each of a plurality of terminal units 17 is configured to include an external sensor 41 that detects an object in the surrounding environment and obtains surrounding environment information including presence or absence and a location of an object around a mobile object (vehicle 15) in which the corresponding terminal unit 17 is installed. The unknown mobile object information is configured to include information on the detection accuracy of surrounding environment information related to the external sensor 41.

In response to receiving a plurality of detected information sets that include (a) a third group of one or more detected information sets and (b) a fourth group of one or more detected information sets, and the third group is based on unknown mobile object information detected by an external sensor 41 providing a first level of detection accuracy and the fourth group is based on unknown mobile object information detected by an external sensor 41 providing a second level of detection accuracy that is lower than the first level of detection accuracy, the determination component 93 of the monitoring unit 19 is configured to prioritize the use of the third group of one or more detected information sets to determine the presence or absence of an unknown mobile object 13.

In the mobile object monitoring system 11 according to the seventh aspect, when a plurality of detected information sets that have been received includes (a) a third group of one or more detected information sets and (b) a fourth group of one or more detected information sets, and the third group is based on unknown mobile object information detected by an external sensor 41 providing a first level of detection accuracy and the fourth group is based on unknown mobile object information detected by an external sensor 41 providing a second level of detection accuracy that is lower than the first level of detection accuracy, the determination component 93 of the monitoring unit 19 prioritizes the use of the third group of one or more detected information sets to determine the presence or absence of an unknown mobile object 13.

In other words, when a plurality of detected information sets that have been received include detected information sets of different levels of accuracy (the third and fourth groups of detected information sets), the determination component 93 of the monitoring unit 19 determines the presence or absence of an unknown mobile object by prioritizing the use of the third group of one or more detected information sets with a higher level of accuracy.

Because the determination component 93 of the monitoring unit 19 determines the presence or absence of an unknown mobile object by prioritizing the use of a group of one or more detected information sets with a higher level of accuracy (the third group) when a plurality of detected information sets that have been received include detected information sets of different levels of accuracy (the third and fourth group of detected information sets), an advantageous effect can be expected for the mobile object monitoring system 11 according to the seventh aspect. Compared to a mobile object monitoring system 11 according to the fifth aspect, the accuracy of determination of the presence or absence of an unknown mobile object and furthermore the accuracy with which the reliability of detected information sets is established is expected to rise.

In an eighth aspect of the disclosure, the mobile object monitoring system 11 is in accordance with the third aspect. Furthermore, the determination component 93 of the monitoring unit 19 installed on a mobile object (a vehicle 15), an own mobile object, is configured to determine a blind spot related to the own mobile object (a vehicle 15), and determine whether a current location of an unknown mobile object 13 is in the blind spot 18 related to the own mobile object (a vehicle 15). In response to receiving a plurality of detected information sets that include (a) a fifth group of one or more detected information sets based on unknown mobile object information indicating that the unknown mobile object 13 is in the blind spot 18 and (b) a sixth group of one or more detected information sets based on unknown mobile object information indicating that the unknown mobile object 13 is not in the blind spot 18, the determination component 93 is configured to determine the presence or absence of the unknown mobile object 13 by prioritizing the use of the fifth group of one or more detected information sets.

In the mobile object monitoring system 11 according to the eighth aspect, the monitoring unit 19 is installed in a mobile object (a vehicle 15), an own mobile object, that is on a requesting side and that requests information regarding an unknown mobile object 13 that is in a blind spot 18 of the own mobile object to be provided. When a plurality of detected information sets that are received include (a) a fifth group of one or more detected information sets based on unknown mobile object information indicating that the unknown mobile object 13 is in the blind spot 18 and (b) a sixth group of one or more detected information sets based on unknown mobile object information indicating that the unknown mobile object 13 is not in the blind spot 18, the determination component 93 determines the presence or absence of the unknown mobile object 13 by prioritizing the use of the fifth group of one or more detected information sets.

In other words, when the determination component 93 of the monitoring unit 19, which is installed in a mobile object (a vehicle 15), receives a plurality of detected information sets that includes a mixture of (a) a fifth group of one or more detected information sets indicating the unknown mobile object 13 to be in a blind spot 18 of the own vehicle 15 and (b) a sixth group of one or more detected information sets indicating the unknown mobile object 13 to not be in the blind spot 18, the determination component 93 determines the presence or absence of the unknown mobile object 13 by prioritizing the use of the fifth group of one or more detected information sets. Since the fifth group of one or more detected information sets indicates the unknown mobile object 13 to be in a blind spot 18 of the own mobile object, prioritizing the fifth group is more meaningful in securing the safe travel of the own mobile object (a vehicle 15).

In the mobile object monitoring system 11 according to the eighth aspect, because the determination component 93 of the monitoring unit 19, in response to receiving a plurality of detected information sets that includes a mixture of (a) a fifth group of one or more detected information sets indicating the unknown mobile object 13 to be in a blind spot 18 of the own mobile object (a vehicle 15) and (b) a sixth group of one or more detected information sets indicating the unknown mobile object 13 to not be in the blind spot 18, determines the presence or absence of the unknown mobile object 13 by prioritizing the use of the fifth group, which is more meaningful in securing the safe travel of the own mobile object (a vehicle 15), an advantageous effect of securing safety of travel of the own mobile object (vehicle 15) can be expected over the mobile object monitoring system 11 according to the fifth aspect.

The mobile object monitoring method according to a ninth aspect of the disclosure is intended to be used in a mobile object monitoring system 11 that includes (a) multiple terminal units 17 that are each installed in a corresponding one of a plurality of mobile objects (vehicles 15) and (b) a single monitoring unit 19 configured to collect information concerning an unknown mobile object 13 around each of the plurality of mobile objects (vehicles 15) and to monitor the unknown mobile object 13.

The mobile object monitoring method includes: acquiring, by each of the multiple terminal units 17, unknown mobile object information that includes information on presence or absence of an unknown mobile object 13; including, by each of the multiple terminal units, location information of the unknown mobile object in the unknown mobile object information in response to the presence of the unknown mobile object 13; generating, by each of the multiple terminal units, a detected information set concerning an unknown mobile object 13, the detected information set including the unknown mobile object information that has been acquired, time information on a time of acquisition of the unknown mobile object information, and identification information concerning the unknown mobile object 13; and transmitting, by each of the multiple terminal units, the detected information set that has been generated.

The mobile object monitoring method further includes: receiving the detected information set transmitted from each of the multiple terminal units 17 and forming a collection of detected information sets by the monitoring unit; and determining the presence or absence of an unknown mobile object 13 based on the received collection of detected information sets by the monitoring unit 19.

The mobile object monitoring method further includes, when determining the presence or absence of the unknown mobile object 13, establishing reliability of detected information sets regarding the received collection of detected information sets based on the number of detected information sets that indicate the detection of a specific unknown mobile object 13 that is at the same location at the same time.

The mobile object monitoring method according to the ninth aspect is a method claim that corresponds to the configuration of the mobile object monitoring system 11 according to the second aspect.

Similar to the mobile object monitoring system 11 according to the second aspect, the mobile object monitoring method according to the ninth aspect monitors an unknown mobile object 13 by collecting, via vehicle-to-vehicle communication or vehicle-to-roadside communication, sets of information regarding an unknown mobile object 13 that are each obtained at a corresponding one of a plurality of detection sites and integrating the sets of information to significantly increase the reliability of information regarding an unknown mobile object 13 in a blind spot 18 related to a point of observation.

In a tenth aspect of the disclosure, the mobile object monitoring method is in accordance with the ninth aspect. Furthermore, the mobile object monitoring method further comprises including type information in the identification information that is included in the detected information set concerning an unknown mobile object, the type information indicating a type of the unknown mobile object.

In determining the presence or absence of the unknown mobile object 13, the mobile object monitoring method may include establishing the reliability of detected information sets regarding the collection of detected information sets based on the type information of an unknown mobile object 13 that is included in the identification information of a group of detected information sets that indicate the detection of a specific unknown mobile object 13 that is at the same location at the same time. The group of detected information sets may make up a part of whole of the collection of detected information sets.

The mobile object monitoring method according to the tenth aspect is a method claim that corresponds to the configuration of the mobile object monitoring system 11 according to the fourth aspect.

Compared to the mobile object monitoring method according to the ninth aspect, the mobile object monitoring method according to the tenth aspect makes the presence of a vulnerable road user as an unknown mobile object 13 more noticeable over the presence of a less vulnerable road user, and an advantageous effect of protecting vulnerable road users with priority can be expected.

Other Embodiments

The embodiments described above are examples for realizing the disclosure. Thus, these embodiments should not be used for limiting the technical scope of the disclosure. The disclosure can be implemented in various forms within a scope not departing from the gist or the major features of the disclosure.

For example, in the description of a mobile object monitoring system 11 according to an embodiment of the disclosure, the reliability setting part 97 establishes the reliability of detected information sets regarding a plurality of detected information sets that have been received with the collecting-side communication component 91 based on the number of detected information sets concerning an unknown mobile object 13 that indicate the detection of a specific unknown mobile object 13 that is at the same location at the same time. However, the algorithm for establishing the reliability of detected information sets is not limited to this example. In one or more embodiments, a different algorithm for setting the reliability of detected information sets may be used.

In some embodiments, the reliability setting part 97 may, regarding a plurality of detected information sets received with the collecting-side communication component 91, establish the reliability of detected information sets based on the type (e.g., a vehicle, motorcycle, bicycle, or pedestrian) of an unknown mobile object 13 that has been detected in a number of detected information sets as a specific unknown mobile object 13 that is at the same location at the same time. For example, when the specific unknown mobile object 13 is a motorcycle, the reliability may be raised based on a point of view that there is a high risk of collision in the case of a motorcycle.

In some embodiments, the reliability setting part 97 may, regarding a plurality of detected information sets received with the collecting-side communication component 91, establish the reliability of detected information sets based on the traveling speed of an unknown mobile object 13 that has been detected in a number of detected information sets as a specific unknown mobile object 13 that is at the same location at the same time. For example, the reliability may be increased with higher traveling speed of the specific unknown mobile object 13.

An embodiment of the disclosure may be realized by supplying a program (a collection of computer executable instructions) that realizes one or more functions of the embodiment to a system or apparatus via a network or a non-transitory storage medium and by having one or more processors of a computer of the system or apparatus read out and execute the computer executable instructions of the program. An embodiment of the disclosure may include a circuit (for example, application specific integrated circuit [ASIC]) that realizes one or more functions of the embodiment. Information including a program that realizes one or more functions of an embodiment may be stored in a non-transitory storage medium such as a memory, a hard disk, a memory card, or an optical disc.

Although left-hand traffic has been used in the example used in the description, the disclosure is also applicable to right-hand traffic.

What is claimed is:

1. A mobile object monitoring system comprising:

one or more terminal units; and a monitoring unit configured to collect information concerning an unknown mobile object around the one or more terminal units and to monitor the unknown mobile object, wherein each of the one or more terminal units is installed in a corresponding one of one or more mobile objects, the monitoring unit is installed in a first mobile object or a roadside unit, each of the one or more terminal units includes a first processor configured to:

acquire unknown mobile object information, the unknown mobile object information including location information of the unknown mobile object;

generate a detected information set concerning an unknown mobile object, the detected information set including the acquired unknown mobile object information, time information on a time of the acquisition, and identification information concerning the unknown mobile object; and transmit the generated detected information set, the identification information included in the detected information set concerning the unknown mobile object includes type information indicating a type of the unknown mobile object, the type of information of the detected information set indicates the type of the unknown mobile object as a pedestrian, a bicycle, a motorcycle, a standard-sized vehicle, or a large-sized vehicle, and the monitoring unit includes a second processor configured to:

receive the detected information set transmitted from each of the one or more terminal units to form a collection of one or more detected information sets;

determine presence or absence of the unknown mobile object based on the collection of one or more detected information sets;

regarding the collection of one or more detected information sets, establish reliability based on a first number of detected information sets that indicate a detection of a specific unknown mobile object that is at the same location at the same time out of the collection of one or more detected information sets and on the type information of the specific unknown mobile object;

determine that the specific unknown mobile object is present in response to the first number exceeding a predetermined response number threshold; and set the predetermined response number threshold according to the type information of the specific unknown mobile object, so that the second processor:

sets the predetermined response number threshold to be lower for the pedestrian than for the bicycle, sets the predetermined response number threshold to be lower for the bicycle than for the motorcycle, sets the predetermined response number threshold to be lower for the motorcycle than for the standard-sized vehicle, and sets the predetermined response number threshold to be lower for the standard-sized vehicle than for the large-sized vehicle.

2. A mobile object monitoring system comprising:

a plurality of terminal units; and a single monitoring unit configured to collect information concerning an unknown mobile object around each of the plurality of terminal units and to monitor the unknown mobile object, wherein each of the plurality of terminal units is installed in a corresponding one of a plurality of mobile objects, the monitoring unit is installed in a first mobile object or a roadside unit, each of the plurality of terminal units includes a first processor configured to:

acquire unknown mobile object information that includes information on presence or absence of the unknown mobile object and, in response to presence of the unknown mobile object, further includes location information of the unknown mobile object;

generate a detected information set concerning an unknown mobile object, the detected information set including the acquired unknown mobile object information, time information on a time of the acquisition, and identification information concerning the unknown mobile object; and transmit the generated detected information set, the identification information included in the detected information set concerning the unknown mobile object includes type information indicating a type of the unknown mobile object, the type information of the detected information set indicates the type of the unknown mobile object as a pedestrian, a bicycle, a motorcycle, a standard-sized vehicle, or a large-sized vehicle, and the monitoring unit includes a second processor configured to:

receive the detected information set transmitted from each of the plurality of terminal units to form a collection of detected information sets; and determine presence or absence of the unknown mobile object based on the collection of detected information sets;

regarding the collection of detected information sets, establish reliability based on a first number of detected information sets that indicate a detection of a specific unknown mobile object that is at the same location at the same time out of the collection of detected information sets and on the type information of the specific unknown mobile object;

determine that the specific unknown mobile object is present in response to the first number exceeding a predetermined response number threshold; and set the predetermined response number threshold according to the type information of the specific unknown mobile object, such that the second processor:

sets the predetermined response number threshold to be lower for the pedestrian than for the bicycle, sets the predetermined response number threshold to be lower for the bicycle than for the motorcycle, sets the predetermined response number threshold to be lower for the motorcycle than for the standard-sized vehicle, and sets the predetermined response number threshold to be lower for the standard-sized vehicle than for the large-sized vehicle.

3. The mobile object monitoring system according to claim 2, wherein the second processor of the monitoring unit installed in the first mobile object is configured to receive the detected information set transmitted from each of the plurality of terminal units to form the collection of detected information sets by communicating with the plurality of terminal units that are each installed in the corresponding one of the plurality of mobile objects.

4. The mobile object monitoring system according to claim 1, wherein the second processor of the monitoring unit is configured to transmit a request to acquire the unknown mobile object information at a specified time, and the first processor of each of the one or more terminal units is configured to acquire the unknown mobile object information at the specified time.

5. The mobile object monitoring system according to claim 4, wherein regarding the collection of one or more detected information sets, the second processor of the monitoring unit is configured to establish the reliability based further on a sum of the first number and a second number, and the second number is the number of one or more detected information sets that indicate absence of the specific unknown mobile object.

6. The mobile object monitoring system according to claim 4, wherein the first processor of each of the one or more terminal units includes an external sensor that is configured to detect an object around a corresponding one of the one or more terminal units to obtain surrounding environment information that includes information on presence or absence and information on a location concerning the object, the unknown mobile object information further includes information on detection accuracy of the surrounding environment information related to the external sensor, the second processor of the monitoring unit is, in response to the collection of one or more detected information sets including a third group of one or more detected information sets and a fourth group of one or more detected information sets, configured to determine presence or absence of the unknown mobile object by prioritizing a use of the third group, the third group of one or more detected information sets is based on the unknown mobile object information that is detected by the external sensor that presents a first level of the detection accuracy, the fourth group of one or more detected information sets is based on the unknown mobile object information that is detected by the external sensor that presents a second level of the detection accuracy, and the first level of the detection accuracy is higher than the second level of the detection accuracy.

7. The mobile object monitoring system according to claim 3, wherein the second processor of the monitoring unit installed in the first mobile object is configured to:

determine a blind spot of the first mobile object;

determine whether or not a current location of the unknown mobile object is in the blind spot of the first mobile object; and determine, in response to the collection of detected information sets including a fifth group of one or more detected information sets and a sixth group of one or more detected information sets, presence or absence of the unknown mobile object by prioritizing a use of the fifth group, the fifth group of one or more detected information sets is based on the unknown mobile object information indicating the unknown mobile object to be in the blind spot, and the sixth group of one or more detected information sets is based on the unknown mobile object information indicating the unknown mobile object to not be in the blind spot.

8. A mobile object monitoring method used in a mobile object monitoring system including a plurality of terminal units that are each installed in a corresponding one of a plurality of mobile objects and a single monitoring unit that is installed in a first mobile object or a roadside unit and is configured to collect information concerning an unknown mobile object around each of the plurality of mobile objects and to monitor the unknown mobile object, the mobile object monitoring method comprising:

acquiring, by each of the plurality of terminal units, unknown mobile object information that includes information on presence or absence of the unknown mobile object and, in response to presence of the unknown mobile object, location information of the unknown mobile object;

generating, by each of the plurality of terminal units, a detected information set concerning an unknown mobile object, the detected information set including the acquired unknown mobile object information, time information on a time of the acquisition, and identification information concerning the unknown mobile object, wherein the identification information includes type information indicating a type of the unknown mobile object and the type of information indicates the type of the unknown mobile object as a pedestrian, a bicycle, a motorcycle, a standard-sized vehicle, or a large-sized vehicle;

transmitting, by each of the plurality of terminal units, the generated detected information set concerning an unknown mobile object;

receiving the detected information set transmitted from each of the plurality of terminal units and forming a collection of detected information sets by the monitoring unit;

determining, by the monitoring unit, presence or absence of the unknown mobile object based on the collection of detected information sets;

establishing, by the monitoring unit, reliability of the collection of detected information sets based on a first number of detected information sets that indicate a detection of a specific unknown mobile object that is at the same location at the same time out of the collection of detected information sets and on the type information of the specific unknown mobile object;

determining, by the monitoring unit, that the specific unknown mobile object is present in response to the first number exceeding a predetermined response number threshold; and setting, by the monitoring unit, the predetermined response number threshold according to the type information of the specific unknown mobile object so that:

the monitoring unit sets the predetermined response number threshold to be lower for the pedestrian than for the bicycle, the monitoring unit sets the predetermined response number threshold to be lower for the bicycle than for the motorcycle, the monitoring unit sets the predetermined response number threshold to be lower for the motorcycle than for the standard-sized vehicle, and the monitoring unit sets the predetermined response number threshold to be lower for the standard-sized vehicle than for the large-sized vehicle.

9. The mobile object monitoring system according to claim 2, wherein the second processor of the monitoring unit is configured to transmit a request to acquire the unknown mobile object information at a specified time, and the first processor of each of the plurality of terminal units is configured to acquire the unknown mobile object information at the specified time.

10. The mobile object monitoring system according to claim 9, wherein regarding the collection of detected information sets, the second processor of the monitoring unit is configured to establish the reliability based further on a sum of the first number and a second number, and the second number is the number of one or more detected information sets that indicate absence of the specific unknown mobile object.

11. The mobile object monitoring system according to claim 9, wherein the first processor of each of the plurality of terminal units includes an external sensor that is configured to detect an object around a corresponding one of the plurality of mobile objects to obtain surrounding environment information that includes information on presence or absence and information on a location concerning the object, the unknown mobile object information further includes information on detection accuracy of the surrounding environment information related to the external sensor, the second processor of the monitoring unit is, in response to the collection of detected information sets including a third group of one or more detected information sets and a fourth group of one or more detected information sets, configured to determine presence or absence of the unknown mobile object by prioritizing a use of the third group, the third group of one or more detected information sets is based on the unknown mobile object information that is detected by the external sensor that presents a first level of the detection accuracy, the fourth group of one or more detected information sets is based on the unknown mobile object information that is detected by the external sensor that presents a second level of the detection accuracy, and the first level of the detection accuracy is higher than the second level of the detection accuracy.

12. The mobile object monitoring system according to claim 3, wherein the second processor of the monitoring unit is configured to transmit a request to acquire the unknown mobile object information at a specified time, and the first processor of each of the plurality of terminal units is configured to acquire the unknown mobile object information at the specified time.

13. The mobile object monitoring system according to claim 12, wherein regarding the collection of detected information sets, the second processor of the monitoring unit is configured to establish the reliability based further on a sum of the first number and a second number, and the second number is the number of one or more detected information sets that indicate absence of the specific unknown mobile object.

14. The mobile object monitoring system according to claim 12, wherein the first processor of each of the plurality of terminal units includes an external sensor that is configured to detect an object around a corresponding one of the plurality of mobile objects to obtain surrounding environment information that includes information on presence or absence and information on a location concerning the object, the unknown mobile object information further includes information on detection accuracy of the surrounding environment information related to the external sensor, the second processor of the monitoring unit is, in response to the collection of detected information sets including a third group of one or more detected information sets and a fourth group of one or more detected information sets, configured to determine presence or absence of the unknown mobile object by prioritizing a use of the third group, the third group of one or more detected information sets is based on the unknown mobile object information that is detected by the external sensor that presents a first level of the detection accuracy, the fourth group of one or more detected information sets is based on the unknown mobile object information that is detected by the external sensor that presents a second level of the detection accuracy, and the first level of the detection accuracy is higher than the second level of the detection accuracy.

* * * * *